United States Patent [19]
Widigen et al.

[11] Patent Number: 5,919,256
[45] Date of Patent: Jul. 6, 1999

[54] OPERAND CACHE ADDRESSED BY THE INSTRUCTION ADDRESS FOR REDUCING LATENCY OF READ INSTRUCTION

[75] Inventors: Larry Widigen, Salinas; Elliot A. Sowadsky, Santa Clara, both of Calif.

[73] Assignee: Advanced Micro Devices, Inc., Sunnyvale, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/622,726

[22] Filed: Mar. 26, 1996

[51] Int. Cl.$^6$ .............................. G06F 12/00; G06F 13/00
[52] U.S. Cl. .............................. 712/218; 711/3; 711/100; 711/123; 711/141; 712/207; 712/237
[58] Field of Search ...................... 395/445–450, 395/452–453, 403, 467–468, 471, 393–394, 800, 392–395, 800.23, 381–383, 584; 711/3, 100, 123, 125–126, 128, 130, 140–141, 143–145, 147, 213; 712/205–207, 216–219, 237, 23

[56] References Cited

U.S. PATENT DOCUMENTS

| | | | |
|---|---|---|---|
| 4,521,851 | 6/1985 | Trubisky et al. | 712/218 |
| 5,029,070 | 7/1991 | McCarthy et al. | 711/143 |
| 5,168,560 | 12/1992 | Robinson et al. | 711/123 |
| 5,226,126 | 7/1993 | McFarland et al. | 395/394 |
| 5,367,656 | 11/1994 | Ryan | 711/213 |
| 5,490,262 | 2/1996 | Tahara | 711/100 |
| 5,551,001 | 8/1996 | Cohen et al. | 711/123 |

FOREIGN PATENT DOCUMENTS

| | | | |
|---|---|---|---|
| 0 010 196 | 4/1980 | European Pat. Off. | G06F 9/34 |
| 0 375 364 | 6/1990 | European Pat. Off. | G06F 9/38 |

OTHER PUBLICATIONS

Todd M. Austin, et al., in "Streamlining Data Cache Access with Fast Address Calculation," Computer Architecture News, V. 23, No. 2, May 1995, p. 369–380.
Michael Golden and Trevor Mudge, in "Hardware support for hiding cache latency." Cse–tr–152–93, University of Michigan, Dept. of Electrical Engineering and Computer, Feb. 1993, 22 pages.
Andrew R. Pleszkun, in "Techniques for Compressing Program Address Traces," MICRO27 Proceedings, Nov. 1994, pp. 32–39.
Samuel P. Harbison, "An Architectural Alternative to Optimizing Compilers", ASPLOS Conference, Association of Computing Machinery, 1982, pp. 57–65.
Stephan E. Richardson, "Caching Function Results: Faster Arithmetic by Avoiding Unnecessary Computation", Technical Report 92–1, Sun Microsystems, Inc., 1992, pp. 1–20.
Chen Tien–Fu et al., "Effective Hardware–Based Data Prefetching for High–Performance Processors," *IEEE Transactions on Computers*, vol. 44, No. 5, pp. 609–623, (May 1995).

(List continued on next page.)

*Primary Examiner*—Zarni Maung
*Assistant Examiner*—Bharat Barot
*Attorney, Agent, or Firm*—Townsend and Townsend and Crew LLP

[57] ABSTRACT

A structure for, and a method of operating, an operand cache to store operands retrieved from a memory. An instruction requiring an operand stored in the memory, is allowed to speculatively execute in an execution unit of a processor using an operand stored in an entry (corresponding to the address of the instruction) of the operand cache. When the actual operand is later retrieved from the memory it is compared to the cached operand used for speculative execution. If the cached and actual operands are unequal then the speculatively executed instruction and all subsequent instructions are aborted and the processor resumes execution at the address of the instruction that was speculatively executed.

31 Claims, 8 Drawing Sheets

OTHER PUBLICATIONS

Hwu Wen–Mei et al., "Comparing Software and Hardware Schemes for Reducing the Cost of Branches," *Computer Architecture Conference Proceedings*, vol. 17, No. 3, Washington, US, (Jun. 17, 1989).

IBM Corporation, "Comprehensive Branch Prediction Mechanism for BC," *Technical Disclosure Bulletin*, vol. 28, No. 5, pp. 2255–2262, (Oct. 1985).

Lee Johnny K. F. et al., "Branch Prediction Strategies and Branch Target Buffer Design," *Computer*, vol. 17, No. 1, pp. 6–22, (Jan. 1984).

OPERAND CACHE ADDRESSED BY THE INSTRUCTION ADDRESS FOR REDUCING LATENCY OF READ INSTRUCTION

BACKGROUND OF THE INVENTION

The present invention relates generally to processor design and more specifically to techniques for caching the values of instruction operands stored in memory.

Various techniques in the field of computer architecture have been developed for increasing processor performance beyond what can be achieved solely via process or circuit design improvements. One such technique is pipelining. Pipelining was extensively examined in "The Architecture of Pipelined Computers," by Peter M. Kogge (McGraw-Hill, 1981). J. L. Hennessy and D. A. Patterson provide a contemporary discussion of pipelining in chapter 6 of "Computer Architecture, A Quantitative Approch" (Morgan Kaufmann, 1990).

Pipeline processors decompose the execution of instructions into multiple successive stages, such as fetch, decode, and execute. Each stage of execution is designed to perform its work within the processor's basic machine cycle. Hardware is dedicated to performing the work defined by each stage. As the number of stages is increased, while keeping the work done by the instruction constant, the processor is said to be more heavily pipelined. Each instruction progresses from stage to stage, ideally with another instruction progressing in lockstep only one stage behind. Thus, there can be as many instructions in execution, as there are pipeline stages. The major attribute of a pipelined processor is that a throughput of one instruction per cycle can be obtained, though when viewed in isolation, each instruction requires as many cycles to perform as there are pipeline stages.

The ability to increase throughput via pipelining is limited by situations called pipeline hazards. Hazards may be caused by, among other things, data dependencies that arise due to the overlapping stages of instruction processing inherent in the pipeline technique. One type of data dependency that frequently arises is associated with an instruction that retrieves an operand from memory into a register. Later instructions that have progressed to a pipeline stage in which an operation using the value stored in that register is to be performed, and instructions depending on the results of operations that use the value stored in the register, must be stalled until the operand is retrieved from memory, i.e. until after the physical memory address of the operand is determined and the operand is retrieved from the memory (either from a unified or data cache, or in the worst case from a performance point of view, from main memory).

In other words, the inter-stage advance of instructions might have to be stalled until the required operand is retrieved. Otherwise, improper operation would result. To prevent such incorrect behavior, "interlock" logic is added to detect this hazard and invoke the pipeline stall. While the pipeline is stalled, there are stages in the pipeline that are not doing any useful work. Since this absence of work propagates from stage to stage, the term pipeline bubble is also used to describe this condition. The throughput of the processor suffers whenever such bubbles occur.

Many potential stalls resulting from data hazards can sometimes be avoided if a program is compiled initially or later recompiled using an optimizing compiler that rearranges program instructions in a manner that is custom tailored to the microarchitecture of the processor. Such optimizing compilers are relatively new, have restricted availability, and do not benefit programs that are already in the field. Rearranging instructions using an optimizing compiler is referred to as static instruction scheduling. The Intel Pentium™Processor is an example of a processor that relies on static instruction scheduling to achieve its full promised performance.

In contrast to static techniques, dynamic instruction scheduling techniques act to rearrange the program instructions at the time the program is running. Dynamic scheduling does not require the use of an optimizing compiler and thus benefits all programs, both new and existing. One dynamic instruction scheduling technique involves the use of largely autonomous execution units that can queue up operations and execute them out of order. One such system is described in U.S. Pat. No. 5,226,126, PROCESSOR HAVING PLURALITY OF FUNCTIONAL UNITS FOR ORDERLY RETIRING OUTSTANDING OPERATIONS BASED UPON ITS ASSOCIATED TAGS, to McFarland et al., issued Jul. 6, 1993, which is assigned to the assignee of the present invention, and hereby incorporated by reference for all purposes.

In the U.S. Pat. No. 5,226,126 processor described a decoder issues operations simultaneously to all of the execution units, each of which queues up only the operations that require its services. During each cycle, each execution unit can service any operation from its queue not subject to an interlock, i.e. can execute operations out-of-order. Thus, despite the fact that some operations queued in the execution units may be subject to an interlock due to data (and other types of) hazards, there is a greater chance during any given cycle that an execution unit has useful work to perform.

Out-of-order execution tends to localize the effects of dependencies to a single execution unit. Because of their loose coupling and independent execution, stalls that affect only one execution unit can be effectively absorbed when that unit is later able to proceed past another execution unit that is held up due to a different dependency. If out-of-order execution were not used, often many of the execution units would be unnecessarily idle. Out-of-order execution results in the execution units doing useful work most of the time.

However, even in processors with loosely coupled execution units capable of out-of-order execution (such as the processor described in U.S. Pat. No. 5,226,126) there is a limit on the number of operations permitted to be outstanding at any time. Thus, given the significant frequency of operations depending (directly or indirectly) on the value of operands read from memory, there is a limit on the degree to which the execution units in even such processors can be kept busy.

SUMMARY OF THE INVENTION

The inventors have observed that the operand (operands) stored in memory required for the execution of a program instruction frequently does (do) not change between repeated executions of the instruction, and have devised a technique to take advantage of this phenomenon in order to improve processor performance.

In particular, the invention provides a structure for, and a method of operating, an operand cache to store operands retrieved from a memory. An instruction requiring an operand stored in the memory, is allowed to speculatively execute in an execution unit of a processor using an operand stored in an operand cache entry corresponding to the address of the instruction. A primary advantage of this approach is the (speculative) removal of interlocks from operations that are waiting on the value of the operand.

When the actual operand is later retrieved from the memory it is compared to the cached operand used for speculative execution. If the cached and actual operands are unequal then the actual operand overwrites the cached operand in the operand cache, the speculatively executed instruction and all subsequent instructions are aborted, and the processor resumes execution at the address of the instruction that was speculatively executed.

In recognition of the significant cost in processor performance associated with abortion of a speculatively executed instruction (and subsequent instructions) that uses an incorrect cached operand, the inventors have devised a technique for increasing the coherency between the operand cache and the memory. In particular, each entry of the operand cache may include an operand address corresponding to the operand stored in the entry. After the address of the actual operand for a speculatively executed instruction is determined, it is compared against the operand address stored in the operand cache entry corresponding to the speculatively executed instruction. The actual operand address overwrites the cached operand address if different. Whenever a write of a particular value to a particular address in the memory occurs, the particular value overwrites the operand stored in each entry of the operand cache whose operand address is equal to the particular address.

Another technique for reducing the frequency (and the associated overhead) of speculative executions using incorrect operands entails estimating the likelihood of the corresponding cached operand being correct. In a specific embodiment, this is achieved by storing a count in each entry of the operand cache, and permitting speculative execution using a cached operand only if the corresponding count exceeds a predetermined threshold. The cached operand is compared with the actual operand retrieved from the memory (even if speculative execution using the cached operand was not permitted on account of an insufficient count) and the corresponding count is incremented (decremented) if the two operands are equal (unequal).

For a fuller understanding of the nature and advantages of the invention, reference should be made to the ensuing detailed description taken in conjunction with the accompanying drawings.

DETAILED DESCRIPTION OF A SPECIFIC EMBODIMENT

Processor Overview

Figure 1:
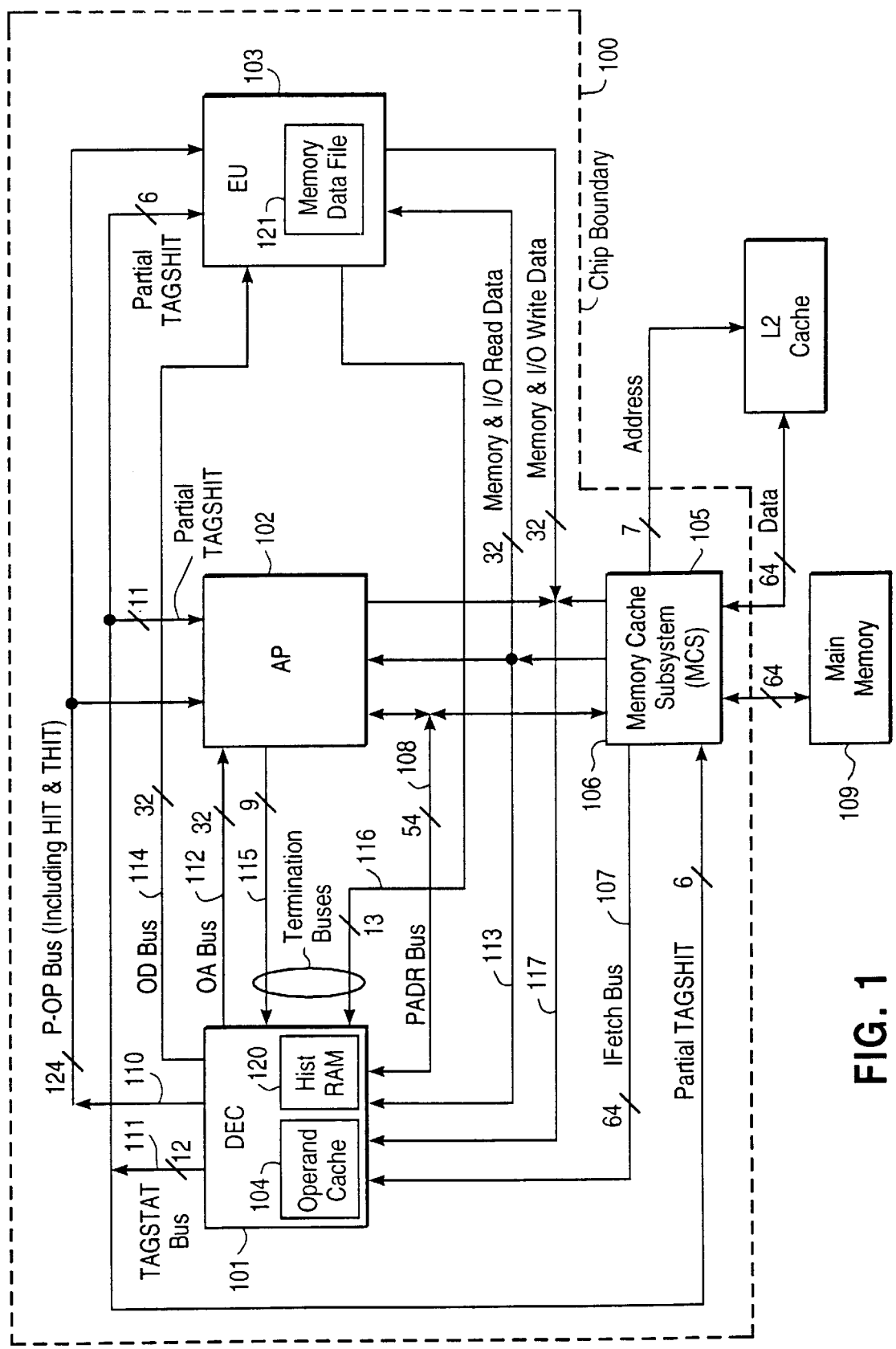
FIG. 1 is a block diagram of a processor containing an operand cache in accordance with the invention.

FIG. 1 depicts a processor 100 containing an operand cache (OC) 104 in accordance with the invention. Processor 100 is described as a pipelined system whose various stages operate independently to a large degree (and is similar in most respects to the processor taught in the U.S. Pat. No. 5,226,126, incorporated by reference, above). However, it will be apparent to one of ordinary skill in the art that the present invention is applicable to other processor architectures such as traditional lock-step pipelines and unpipelined systems.

Processor 100 includes a decoder unit (DEC) 101, an address preparation unit (AP) 102, an execution unit (EU) 103, possibly other execution units (not shown) and a memory/cache subsystem 105. Hereinafter, the term "execution unit(s)" used without a reference numeral also encompasses AP 102 and is used to describe entities that execute (carry out) the data or address manipulations required by the operations. Generally, these units are capable of superscalar pipelined speculative and out-of-order execution. Each execution unit provides termination status information, regarding each operation it has executed, to DEC 101. In particular, AP 102 (EU 103) sends termination status information to DEC 101 via a termination status bus 115 (116).

AP 102 contains a relabeled copy of the general purpose registers and segment registers and has the hardware resources for performing segmentation and paging of virtual memory addresses. A duplicate copy of the general purpose registers is also maintained in EU 103. The segment and descriptor virtual register file is entirely and solely within the address unit. AP 102 calculates addresses for memory operand reads and writes, control transfers (including branches, calls, and protected-mode gates), and sequential instruction execution across page boundaries (page crosses).

In one embodiment EU 103 is an integer execution unit responsible for executing integer arithmetic operations. As mentioned above, EU 103 also contains a relabeled virtual copy of the general purpose registers (kept coherent with the copy of AP 102) and has the hardware resources for performing integer arithmetic and logical operations. Duplicate general register files insure minimal delays between the registers and the logic that manipulates their values. It also permits read and write accesses based on the needs of each execution unit, which would otherwise require an increase in the number of read and write ports.

DEC 101 specifies an instruction octet to be retrieved (sometimes referred to as "prefetching") by initially passing the initial address of a sequence of the instruction octet to MCS 105 via an address bus 108 and then requesting additional octets from memory via control signals (not shown). If MCS 105 contains a level one (i.e. on-chip) cache, it first attempts to retrieve the specified instruction octet from the level one cache. If the level one cache does not store the specified octet or there is no level one cache, MCS 105 then attempts to retrieve the specified octet from a level two (i.e. off-chip) cache 106. If level two cache 106 does not store the specified octet, then MCS 105 retrieves the specified octet from a main memory 109. (The combination of cache 106, memory 109 and the level one cache, if existing, is referred to hereinafter as "the memory".) In any event, the retrieved instruction octet is passed by MCS 106 to DEC 101 via an instruction fetch bus 107.

DEC 101 decodes instructions from the octets retrieved by MCS 105 and translates each of the instructions into one or more simpler operations that the various execution units (i.e. AP 102, EU 103 and possibly other units not shown) understand. These operations are sometimes referred to as pseudo-operations or p-ops. DEC 101 retains information about the translation process for later action based on termination information received from the various execution units, discussed below. In particular, DEC 101 includes a history RAM 120 for storing the address of the instruction corresponding to each issued operation. As will be discussed below, upon abortion of an instruction due to an operation that executes with an incorrect operand from OC 104, instruction retrieval will commence with the instruction address stored in the entry of history RAM 120 corresponding to the erroneously executed operation.

DEC 101 also issues (transmits) the operations to the various execution units via an operations bus 110. A plurality of the control fields of an operation are operation commands unique to a specific execution unit. Other operation fields (such as source and destination specifiers) are shared among multiple execution units. Each operation is a collection or "packet" of all unique and shared control command fields. The fields are either largely unencoded or recoded into formats that greatly facilitate or eliminate any further decoding by the execution units. Every operation packet is issued to all units simultaneously.

Each instruction will result in one or more operations being issued. DEC 101 time-stamps each operation it generates. These time-stamps are called tags. The tagged operations are issued to the execution units via operations bus 110 and each unit autonomously executes the operations for which it is responsible. Whether or not a particular execution unit will execute a given operation varies according to whether the original instruction required the specialized function associated with the execution unit. Each operation issued by DEC 101 is given a tag which uniquely identifies each operation currently outstanding in the machine. Tags are issued in increasing order, allowing easy determination of relative age of any two outstanding tags. Up to 14 operations are allowed to be outstanding. Each tag is a 5-bit quantity, thereby permitting a two's complement signed comparison to indicate the relative age of two tags. However, at any point in time, only the four least significant bits of a tag are required to unambiguously identify an operation. (In other embodiments, more or fewer operations could be permitted to remain outstanding, thereby perhaps changing the number of bits required for each tag.) Upon the issuance of an operation, DEC 101 stores the address of the associated instruction in the entry of history RAM 120 indexed by the least four significant bits of the operation's tag. When an abort occurs rolling back the processor state to just before the operation with tag=i, then DEC 101 issues new operations from this point with tags starting at i, in order to ensure the reliability of relative age comparison.

Bus transactions between functional units (i.e. DEC 101, AP 102, EU 103 and MCS 105) include the tag of the originating operation. Functional units pair up operations, addresses, and operands with these tags. The execution units provide terminations used for pipeline control to DEC 101. The use of terminations is discussed further below in the section on speculative execution. DEC 101 is responsible for tracking operations from the time of issue through the time of retirement. If all the operations associated with an instruction are processed by the required execution units without any errors detected (all normal terminations), then all the operations for the instruction are simultaneously retired. If any of the execution units detect any faults on any of the operations, then all of the operations associated with the instruction and all "younger" p-ops are aborted.

An internal operation is considered "outstanding" from the time it is issued up until the time it is retired or aborted. It is considered "fully terminated" as soon as it is terminated by all required functional units. Since operations are retired or aborted in groups (normally associated with an instruction) an operation may be fully and normally terminated but still remain outstanding.

The execution units receive memory and I/O requests including returned data and instructions via MCS 105, discussed below. MCS 105 includes write reservation queues for write operations and read after write short-circuit paths. The write reservation queues permit the execution units to post their results for an operation to MCS 105 and then proceed without waiting to execute their operation. The write reservation queues independently accept physical addresses and result data, which are generally independently generated out-of-order by different units. All addresses and data are sent to MCS 105 with the tag of the operation associated with the address or data. The write reservation queues then use the tags to correctly associate the addresses with the data. The write reservation queues also use the tags to enforce the original sequential program order for all stores to memory.

Stores to memory are considered irreversible, and hence are only performed when it is completely safe to do so. MCS 105 waits to do the store until the tag associated with the store is older than the oldest outstanding operation, as indicated by the DEC on a tag status bus 111. Reads to locations where an "older" write is pending in the write reservation queues get their data from the write reservation queue instead of from memory. This is the read after write short-circuit mentioned above. More details on the utilization of write reservation queues is taught in U.S. Pat. No. 5,226,126, incorporated by reference, above.

Each execution unit has its own queue into which incoming operations are placed pending execution and is free to execute its operations largely independent of the other execution units. Each execution unit only executes those operations that require processing by that unit. It is possible for one unit to finish an operation associated with a "younger" instruction, while another unit is still executing an operation corresponding to an older instruction. Thus, instructions can be executed in other than their original program order. Such out-of-order execution tends to localize the effects of dependencies to a single execution unit. Thus a dependency in AP need not stall the EU, and vice versa. Because of their loose coupling and independent execution, stalls that affect only one execution unit can be effectively absorbed when that unit is later able to proceed past another execution unit that is held up due to a different dependency. If out-of-order execution were not used, often many of the execution units would be unnecessarily idle. Out-of-order execution results in the execution units doing useful work most of the time.

While the execution units are busy, DEC 101 continues to fetch and decode instructions, and issue operations, in a manner largely decoupled from the activity of the execution units. Upon completing execution of each operation, the execution units send termination signals to DEC 101 (in particular, AP 102 and EU 103 use termination busses 115 and 116, respectively, for this purpose). These terminations are associated with the operation's tag. DEC 101 keeps track of all terminations corresponding to each tagged operation. Since the tags are like time-stamps, the relative age of operations is discernable from the tags. Issued operations that have yet to be retired or aborted are considered outstanding. If an operation is normally terminated by all units involved, DEC 101 will "retire" the operation, unless an older operation is still outstanding.

If an operation is abnormally terminated, DEC 101 "aborts" all operations equal to and younger than the operation that was abnormally terminated, i.e. informs all execution units (and MCS 105) to stop executing operations having the tag of the operation or a tag of a younger (i.e. later issued) operation by setting an abort bit of tag status bus 111 and placing the tag of the abnormally terminated operation on tag status bus 111. (When the tag bit of tag status bus 111 is cleared, the tag number carried on bus 111 indicates the tag of the oldest outstanding operation.) Instruction aborts cause the processor state to revert to that associated with some previously executed instruction. Multiple operations may be retired or aborted simultaneously. As will be discussed below, an operation may be aborted because it executed using an operand from operand cache 104 later determined to be incorrect.

The execution units maintain archival versions of those portions of the processor state that have changed in association with the execution of the outstanding operations. When operations are retired, the changes made by the retiring operations are made irreversible. In contrast, when operations are aborted, the processor state reverts to that existing prior to the executidefine the aborted operations. Again, the tags are used to define the precise time to which the processor state is reverted. (Tags are also used in MCS 105 to enforce the order in which the program expects data to be stored, as discussed above.)

Register relabeling (also known as register reassignment) is one possible technique to enable processor 100 to perform speculative execution. It is a method by which processor 100 maintains the archival versions of the general register file, the segment registers, and the associated "hidden" descriptor registers. The number of registers within each of AP 102 and EU 103 ("physical registers") is larger than the number of registers that can be specified by an instruction ("virtual registers"). Specifically AP 102 and EU 103 have as many additional registers as there are possible outstanding operations than can change the registers. Unlike conventional register files, the register files of AP 102 and EU 103 do not have permanently assigned register names. Instead, the register name (i.e. virtual register associated with) of each physical register varies with time and the requirements of the program. Further, multiple physical registers can correspond to the same virtual register, each of the multiple registers being associated with the execution of different outstanding operations.

The register relabeling is transparently managed by DEC 101. At the time each operation is issued, DEC 101 "relabels" (or reassigns) the (virtual) register specifiers used by the instructions into new and different (physical) register specifiers that are part of each operation. DEC 101 is responsible for tracking the tagged operations, maintaining a pool of available physical registers (the free list), maintaining the mapping between the physical and virtual register specifiers for each operation, and controlling whether to retire or abort operations, as discussed, above. Register relabeling reduces the performance degradation associated with the aborting of speculatively executed operations. Aborts cause the state of processor 100 to revert to that associated with some previously executed operation. Aborts are largely transparent to the execution units, as most processor state reversion is managed through the dynamic register relabeling specified by DEC 101 in subsequently issued operations. U.S. Pat. No. 5,226,126, incorporated by reference above, describes a technique of register reassignment in more detail.

Operand Cache

For the purposes of illustrating the invention, the discussion will focus on an operation that is to be executed in EU 103 and that requires an operand that is stored in the memory (hereinafter referred to as "the read operation", the associated instruction hereinafter referred to as "the read instruction"). DEC 101 places the read operation (as well as any other operations associated with the decoded read instruction) onto operation bus 110. AP 102 reads the read operation from operation bus 110 and calculates the address of the operand associated with the operation. Then AP 102 passes this address onto MCS 105 via address bus 108 in order to retrieve the required operand from the memory. MCS 105 retrieves the required operand from the memory and places it on a memory and I/O read data bus 113.

After decoding the read instruction into the read operation (and possibly other operations) and before placing the read operation onto operation bus 110, DEC 101 attempts to retrieve an operand and an operand address for the read instruction from OC 104. The success of this attempt depends on the fulfillment of three conditions, discussed below. If the attempt is successful, DEC 101 passes the operand retrieved from OC 104 along an operand datum (OD) bus 114 to EU 103 where it is stored in a memory data file (MDF) 121 until EU 103 is ready to execute the read operation, as discussed in more detail below. In addition, DEC 101 passes the operand address retrieved from OC 104 along an operand address (OA) bus 117 to AP 102, where it will later be compared with the actual operand address calculated by AP 102, as discussed below in more detail.

By providing an operand from OC 104, execution of the read operation can proceed immediately on a speculative basis, i.e. it becomes unnecessary for EU 103 to wait for AP 102 to calculate the operand address and for MCS 105 to retrieve the operand stored at this address. (It is noted, however, that these two tasks are still required in order to verify the correctness of the cached operand, as described below. In other embodiments, consistency between the memory and operand cache 104 might be always maintained, thereby obviating the need to verify the correctness of the cached operand.) Thus, the interlock on the read operation can be speculatively removed. In addition, due to this earlier execution of the read operation, the interlocks on other operations waiting on the results of the read operation may be removed earlier than they would otherwise be if the read operation did not execute until the actual operand was returned from MCS 105.

Without operand cache 104, the delay in executing the read operation incurred while waiting for AP 102 and MCS 105 to perform the tasks described immediately above would also delay operations, subsequently placed on operations bus 110 by DEC 101, that depend on the result of the execution of the read operation. Given that only a fixed number of operations are permitted to remain outstanding within processor 100 at any point in time, the delay (associated with operand address calculation and subsequent operand retrieval from memory) in executing read instructions in a processor similar to processor 100 but without an operand cache would, on average, result in more idle cycles. An idle cycle is a cycle during which one or more of the execution units are unused (i.e. don't have operations in their respective queue that they can execute during the cycle), and, thus, represents suboptimal use of the processor.

Figure 2:
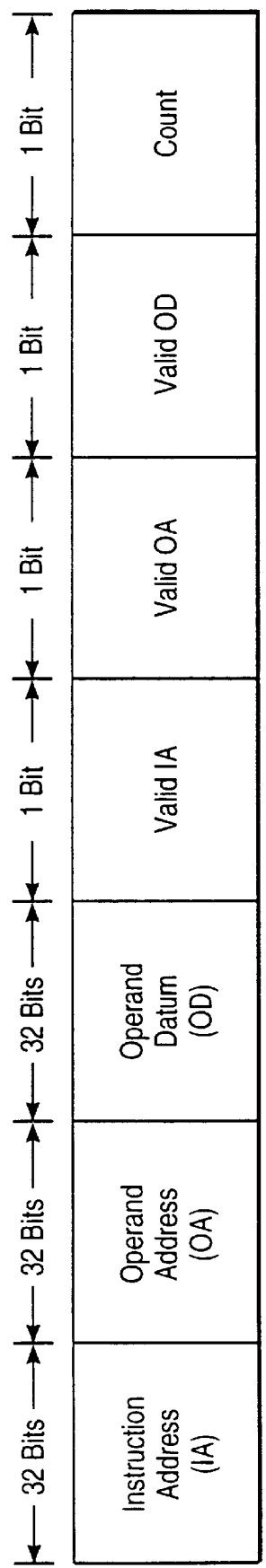
FIG. 2 illustrates the format of each entry of an operand cache.

FIG. 2 depicts the format of each entry of OC 104. Each entry consists of a 32-bit instruction address (IA) field, an operand address (OA) field for storing a 32-bit byte address, a 32-bit operand datum (OD) field for storing up to a double word, a 1-bit Valid IA (VIA) field, a 1-bit Valid OA (VOA) field, a 1-bit Valid OD (VOD) field, and a 3-bit COUNT field. The IA field holds the address of an instruction which makes a memory read access (i.e. a "read instruction" requiring an operand stored in memory). The OD field holds a predicted value for the operand associated with the instruction (this value hereinafter referred to as a cached operand). The OA field holds an operand address corresponding to the cached operand. The two least significant bits of the OA field and the size of the operand determine the particular bytes of the OD field used to store the cached operand. For example, a 2-byte operand is stored in the third and fourth bytes of the OD field if the 2 LSBs of the OA field are 10. The OD field in the described embodiment does not store an operand that straddles a double-word boundary. (In other embodiments, the size of the OD field could be different. For example, if the OD field holds 8 bytes, then the particular bytes of the OD field in which a cached operand is stored are determined by the 3 LSBs of the operand address stored in the OA field and the size of the operand.) The VIA, VOA and VOD fields store 1-bit valid bits for the IA, OA and OD fields, respectively.

The COUNT field stores a measure of the likelihood that the corresponding OD field stores the correct operand value (i.e. is equal to the operand in the memory specified by the read operation). In another embodiment, the COUNT field could be replaced by a 5-bit history bit pattern (HBP) field that contains a respective bit indicating the result of each of the last five comparisons (1 indicating equality) between the operand cached in the entry and the actual operand retrieved by MCS 105. The indicated sizes for the COUNT or history bit pattern fields are clearly not critical, and could be varied in alternative embodiments.

The part of OC 104 that stores the IA fields is a fully associative Content Addressable Memory (CAM) structure. Thus, DEC 101 passes the address of a read instruction to OC 104, which instruction address is compared to the IA field of each entry of OC 104. (It will be obvious to one of ordinary skill in the art that in other embodiments, the part of OC 104 that stores the IA fields could either be a direct-mapped structure or a set-associative structure, both of which would be indexed by a part of a specified instruction address. In such embodiments, the IA field would only have to store the part of the instruction address not used for indexing.) The part of OC 104 that stores the OA fields is also a fully associative Content Addressable Memory (CAM) structure and is used to maintain coherence between operands stored in the memory and operands cached in OC 104, as described below.

Figure 3:
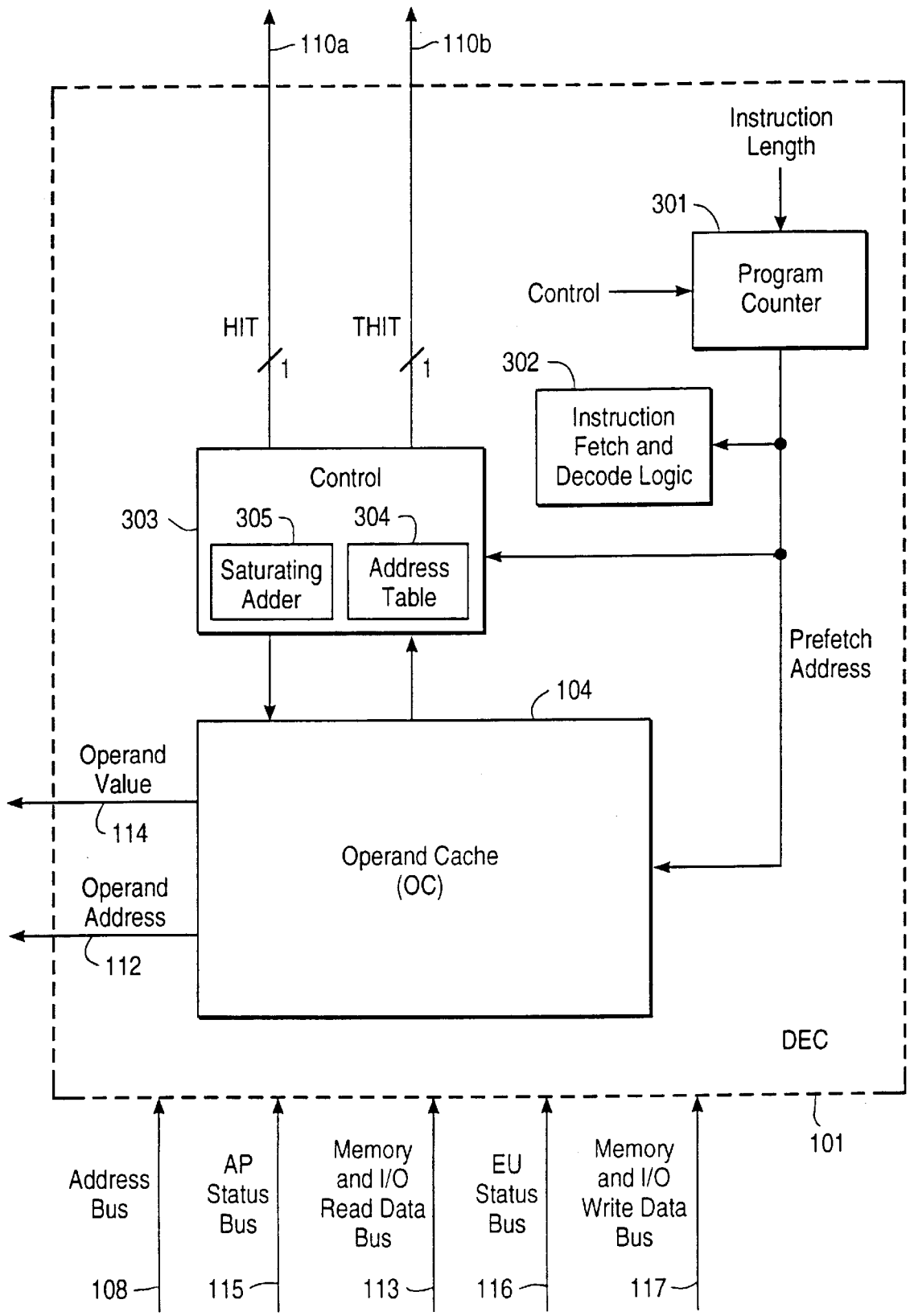
FIG. 3 illustrates a decoder containing an operand cache.

FIG. 3 illustrates the operation of DEC 101 in more detail. A program counter 301 determines an address (prefetch address) of an instruction to be retrieved from memory. The prefetch address is passed from program counter 301 to instruction and fetch decode logic 302 (which initiates the retrieval of the instruction octet from memory and carries out the decoding of the retrieved instruction into one or more operations to be carried out by AP 102 and EU 103) and to OC 104. Operation of OC 104 is determined by the following three conditions:

1) The IA field of an entry of OC 104 matches the prefetch instruction address.

2) Each of the VIA, VOA and VOD bits in the matching entry is set.

3) The value in the COUNT field of the matching entry exceeds a predetermined threshold. (In the alternative embodiment described above where the COUNT field is replaced by a history bit pattern, the third condition is satisfied if the prediction bit in the entry of a 32-entry history ROM (not shown) indexed by the 5-bit history bit pattern of the matching entry is set. As an alternative to the history ROM, the third condition could be satisfied if the prediction bit output of a combinatorial circuit (not shown) is set when the circuit's 5-bit input is the history bit pattern of the matching entry. Techniques for determining the appropriate prediction bit for a given history bit pattern are well known in the art.)

A control logic 303 contains a comparator (not shown) for comparing the COUNT field of the matching entry with the predetermined threshold (or contains the above-described history ROM or combinatorial circuit, in the history bit pattern embodiment). In addition, control logic 303 contains a 16-entry address table 304 for storing the prefetch addresses associated with the outstanding operations. In particular, the current prefetch address is stored in the table entry indexed by the four least significant bits of the tag of the read operation associated with the prefetched instruction. The use of table 304 is described further below.

If all three of the above conditions are satisfied, then DEC 101 retrieves an operand and corresponding operand address from OC 104, passes the cached operand to EU 103 on operand datum (OD) bus 114, passes the cached operand address to AP 102 on operand address (OA) bus 112, and control logic 303 asserts a "HIT" signal on line 110A (which is part of operation bus 110). The "HIT" signal indicates to EU 103 that the operand passed on OD bus 114 can be used to (speculatively) execute the read operation associated with the prefetched instruction (also passed to EU 103 by DEC 101 on operation bus 110). The particular bytes of the OD field that are retrieved are determined by the 2 LSBs of the OA field and by the size of the operand required by the read operation If only the first two of the above three conditions are satisfied, then DEC 101 retrieves an operand and corresponding operand address from the matching entry of OC 104, passes the cached operand to EU 103 on OD bus 114, passes the cached operand address to AP 102 on OA bus 112 and control logic 303 asserts a "HIT" signal on line 110A (which is part of operation bus 110) which indicates to EU 103 that the operand passed on OD bus 114 is not to be used for speculative execution of the read operation.

The purpose of the third condition involving the COUNT field (or alternatively a history bit pattern field), is to avoid the overhead (described below) incurred when a read instruction (and all subsequently decoded instructions) must be aborted in the event that a read operation corresponding to the read instruction executes using an incorrect operand value from OC 104. The COUNT field of an entry of OC 104 provides some indication of the likelihood of the correctness of the value stored in the OD field of the entry by keeping track of the accuracy of the operand cached in the OD field during previous executions of the same read instruction. (In other embodiments, values other than a count or a history bit pattern could be used to provide such an indication.) The reason a cached operand value and a cached operand address are provided to EU 103 and AP 102, respectively, even if only the first two conditions above are satisfied is to permit the cached operand to be compared against the memory operand for the purpose of updating the COUNT (or HBP) field, as described below.

After DEC 101 has decoded the prefetched instruction, placed the associated operations on operation bus 110 and (possibly) placed a cached operand and a cached operand address on busses 114 and 112, respectively, DEC 101 passes the next prefetch address to MCS 105 and repeats the above process for the next instruction to be executed.

Writes to MCS 105 could result in inconsistency between a cached operand in OC 104 and the corresponding operand stored in the memory. If the entry storing the cached (but outdated, due to a write to memory) operand meets the above three conditions, then EU 103 might speculatively execute using the outdated cached operand. In order to reduce the frequency of speculatively but erroneously executed instructions, processor 100 employs the following coherence scheme to keep OC 104 more current:

When processor 100 speculatively performs a write to memory, the (32-bit) write address placed on address bus 108 by AP 102 is compared against the OA field of every entry of OC 104. The value to be written (which will have been placed on a memory and I/O write data bus 117 by either AP 102 or EU 104) is used to update the OD field of each entry of OC 104 whose OA field matches the write address. (Alternatively, the updating of OC 104 could be postponed until the instruction requiring the write to memory has been successfully retired.)

When a device other than processor 100 performs a write to memory, the write address placed on address bus 108 by MCS 105 is compared against the OA field of every entry of OC 104. The value to be written (which will have been placed on memory and I/O write data bus 117 by MCS 105) is used to update the OD field of each entry of OC 104 whose OA field matches the write address.

A write address will match the OA field of an entry of OC 104 when the 30 MSBs of each are the same. The number of bytes to be written, and the 2 LSBs of the write address will determine the particular bytes of the OD field of a matching entry of OC 104 that are updated. For example, if the 2 LSBs of the write address for a two byte transfer are 10 then the third and fourth bytes of the OA field will be updated. If the OA field of a particular entry only caches the second of the two bytes that are written, then the 2 LSBs of the OA field will be 11. If all 32 bits (instead of the 30 MSBs) of the OA field and the write address were compared to determine matching entries of OC 104 then the particular entry described immediately above would not be modified and the one byte operand cached therein in the fourth byte of the OD field would no longer reflect the value of the operand stored in memory, thereby resulting in a greater chance of having to abort a speculatively executed (with an incorrect cached operand) instruction. (In other embodiments, the size of the OD field could be different. For example, if the OD field holds 8 bytes, then the particular bytes of the OD field of each matching entry that would be updated would be determined by the 3 LSBs of the write address and the number of bytes written. A matching entry would be one whose OA field has the same 29 MSBs as the write address.)

As follows from the above discussion, the purpose of having an OA field in OC 104 is to help maintain the consistency between operands cached in OC 104 and corresponding operands stored in the memory. In other embodiments, the OA field (and thus the VOA field) could be eliminated at the cost of reduced performance caused by a greater frequency of speculatively executed instructions that have to be aborted (due to a greater frequency of outdated operands cached in OC 104). The conditions, in such embodiments, for providing an operand from an entry of OC 104 to EU 103 would be 1) the IA field matches the address of the read instruction AND 2) the VIA and VOD bits are set. In addition, the COUNT field would have to exceed the predetermined threshold in order for EU 103 to be permitted to speculatively execute with the cached operand. The COUNT field would be incremented (decremented) upon determining that the cached and actual operands are equal (unequal).

Figure 4:
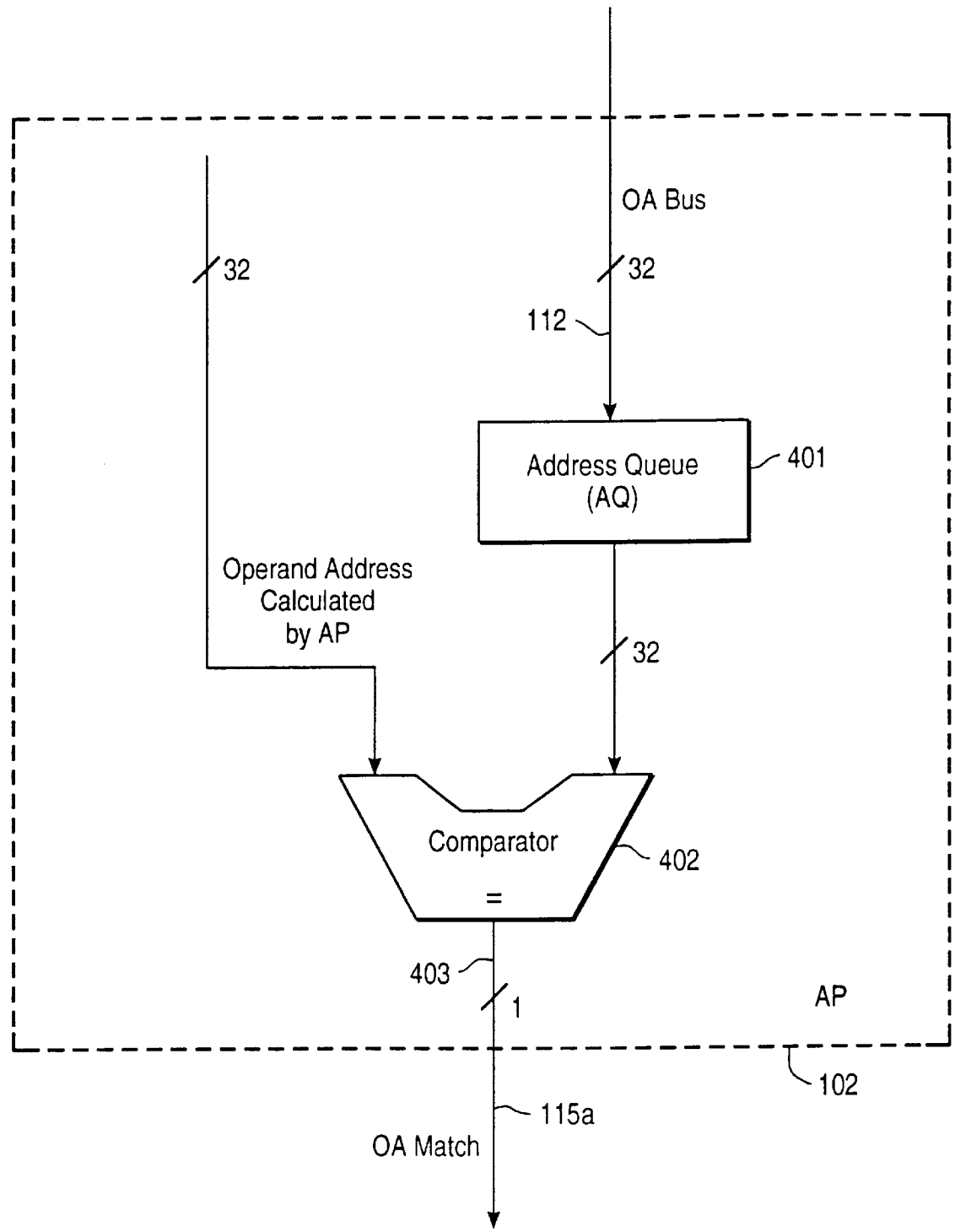
FIG. 4 illustrates the comparison performed within the address processor between calculated and cached operand addresses.

FIG. 4 illustrates the comparison performed within AP 102 between a cached operand address passed to AP 102 and the correct operand address computed by AP 102. When a cached operand address is passed to AP 102 on OA bus 112, as described above, the cached operand address is stored in an address queue (AQ) 401 (in an entry, of AQ 401, indexed by the four least significant bits of the tag of the associated read operation). Later, when AP 102 has calculated the operand address associated with a read operation having a particular tag, a comparator 402 compares the calculated operand address with the cached operand address stored in AQ 401 corresponding to the same tag. The result of the comparison is output on comparator output 403. Comparator output 403 is coupled to a line 115A which is part of termination status bus 115 (FIG. 1) on which AP 102 reports the status of its address calculation to DEC 101.

If the termination status placed by AP 102 on bus 115 indicates that the occurrence of a fault during calculation of the operand address (e.g. illegal address) then DEC 101 clears the VIA, VOA, and VOD bits of the entry in OC 104 for the read instruction, when the read instruction is retired (i.e. all previously retrieved instructions have successfully executed). At this time, DEC 101 aborts the read instruction (and subsequently decoded instructions), i.e. informs all execution units (and MCS 105) to stop executing operations having the tag of the oldest operation issued as a result of decoding the read instruction (not necessarily the operation that speculatively and erroneously executed) or a tag of a younger (i.e. later issued) operation. This is preferably done by setting the abort bit of tag status bus 111 and placing the tag of the oldest operation issued as a result of decoding the read instruction on tag status bus 111. In addition, DEC 101 sends an operation over operation bus 110 requesting AP 102 to calculate the address of the appropriate fault handler. After performing the required calculation, AP 102 sets a program counter to the calculated address so that execution of the fault handler may proceed.

On the other hand, if the termination status placed by AP 102 on bus 115 indicates only that the calculated operand address and the cached operand address (passed to AP 102 on OA bus 112) are unequal, then DEC 101 clears the VOD bit and updates the OA field with the correct operand address (that was calculated and placed on address bus 108 by AP 102).

Figure 5:
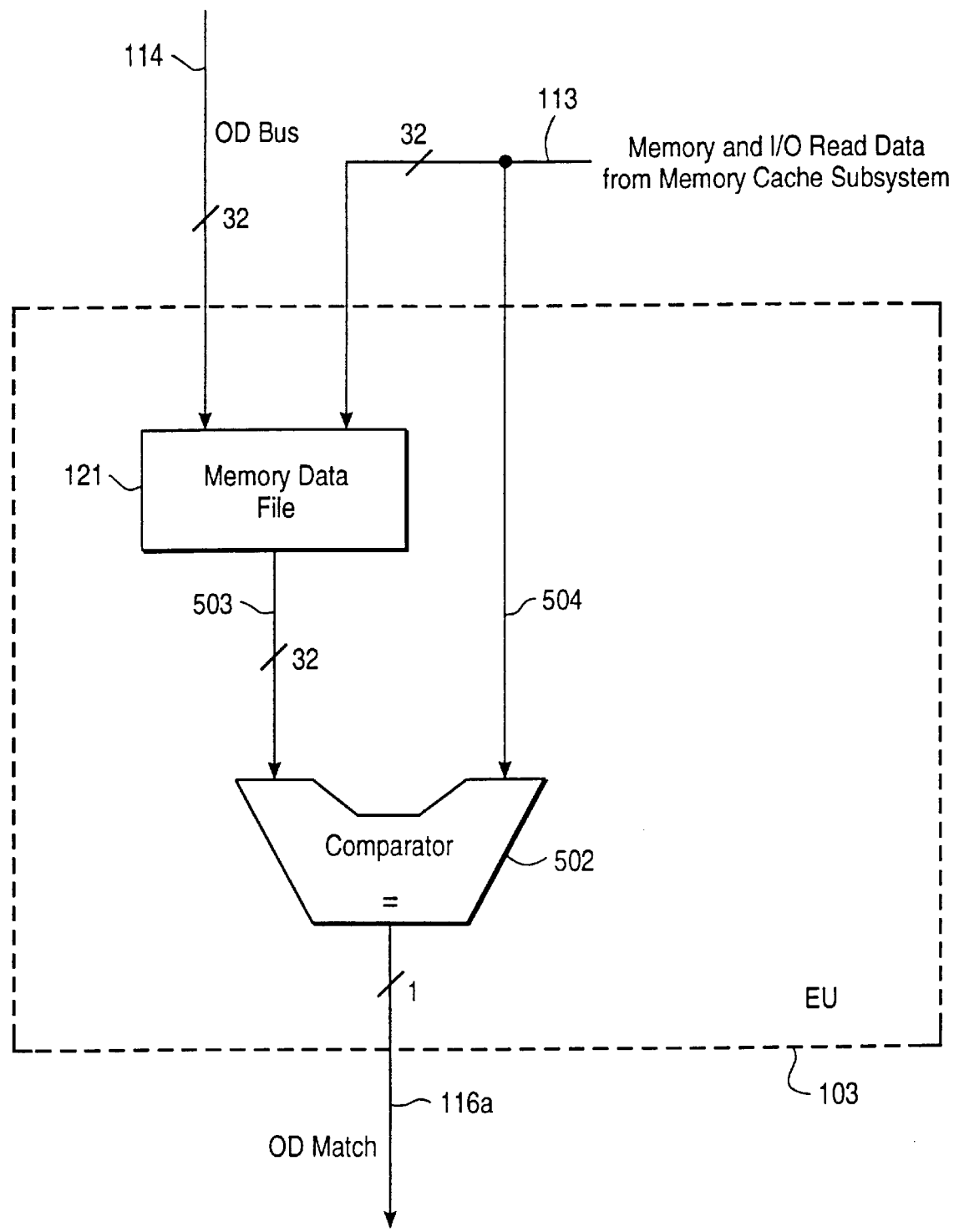
FIG. 5 illustrates the comparison performed within the execution unit between an actual operand and a cached operand.

FIG. 5 illustrates the comparison performed within EU 103 between an operand cached in OC 104 (and passed to EU 102 via OD bus 114) and the actual operand stored at the operand address computed by AP 102 and returned by MCS 105 to EU 102 via memory and I/O read data bus 113. When passed to EU 103, a cached operand is stored in an entry (indexed by the four least significant bits of the tag of the associated read operation) of memory data file 121 (MDF), where the cached operand remains until EU 103 is ready to use it. Each entry of MDF 121 can store an operand and further includes three valid bits, i.e. a Prediction Valid (PV) bit, a Prediction Used bit (PU) bit and a Datum Valid (DV) bit.

When a cached operand from OC 104 is written into an entry of MDF 121, the PV bit of that entry is set (thereby informing EU 103 that an operand is available for the read operation whose tag indexes the entry). If no data is provided to MDF 121 when the operation is issued on operations bus 110 the PV bit is cleared. In addition, the entry's PU and DV bits are cleared at this time. If EU 103 uses the cached operand (which is permissible only if the HIT signal on line 110A was asserted when the read operation was issued on operations bus 110) before the actual operand is returned from MCS 105, then the EU 103 sets the PU bit of the entry (thereby recording the fact that the cached operand was used for speculative execution).

When the actual operand stored in the memory (and the tag of the read operation that caused this operand to be retrieved from the memory) is returned from MCS 105 over memory and I/O read data bus 113 to EU 103, EU 103 provides the cached operand, which is stored in the entry of memory data file 121 indexed by the four least significant bits of the tag, to an input 503 of a comparator 502, writes the actual operand into the entry (thereby overwriting the cached operand), and sets the entry's DV bit (thereby recording the fact that the actual operand is now stored in the entry and thus can be used by EU 103 for non-speculative execution). In addition, the actual operand is provided to an input 504 of comparator 502. The result of the comparison between the cached and actual operands is provided to DEC 101 via line 116A, which is part of an EU termination status bus 116 (FIG. 1). In addition, EU 103 provides DEC 101, via status bus 116, with an indication of whether the cached operand was used for speculative execution by EU 103 (i.e. the value of entry's PU bit).

If the VOD bit in the entry of OC 104 for the read instruction is cleared (which would be the case, for example, if the cached operand address did not equal the operand address computed by AP 102, as described above), DEC 101 updates the OD field with the actual operand (placed by MCS 105 on memory and I/O read data bus 113) and sets the VOD bit. In addition, if the VOD bit in the entry of OC 104 for the read instruction is set and the status returned from EU 103 to DEC 101 on bus 116 indicates that the cached operand was not equal to the actual operand stored in the memory, DEC 101 updates the OD field with the actual operand.

If the status returned from EU 103 to DEC 101 on bus 116 indicates that the cached operand was not equal to the actual operand stored in the memory AND that the cached operand was used for speculative execution by EU 103, then DEC 101 aborts the associated read instruction and all subsequently decoded instructions. (In other embodiments, processor 100 might not abort subsequently decoded instructions, or even other operations associated with the read instruction, that don't depend on correct execution of the read operation.) To achieve this, DEC 101 commands all execution units (and MCS 105) to stop executing operations having the tag of the oldest operation issued as a result of decoding the read instruction (not necessarily the read operation that speculatively and erroneously executed) or a tag of a younger (i.e. later issued) operation by setting the abort bit of tag status of tag status bus 111 and placing the tag of the oldest operation a result of decoding the read instruction on tag status bus 111. DEC 101 retrieves the address of the read instruction from the entry of history RAM 120 indexed by the four least significant bits of the tag of the operation that executed erroneously, sets program counter 301 to this address (thereby recommencing the usual process of prefetching instructions starting with the aborted read instruction), and starts decoding prefetched instructions and issuing operations to the execution units, starting with a tag equal to that of the oldest operation associated with the abort read instruction. The register reassignment technique, described above, enables DEC 101 to reset the register state of processor 100 to that existing before the execution of the read instruction.

The above description demonstrates that there is a significant cost to speculatively executing with an incorrect operand from OC 104 (as opposed to just waiting for the actual operand to be returned from the memory). This includes the cost of prefetching and decoding the aborted read instruction and subsequent instructions that would have already been prefetched and decoded, and perhaps partially or totally executed, by the time the actual operand was retrieved from the memory if speculative execution of the read instruction had not been undertaken. It is for this reason, i.e. to minimize the cost of erroneous and speculative execution while obtaining the benefit of some speculative and correct execution that it may be useful to store a COUNT field (or some similar entity) in each entry of OC 104, as described above.

If the status returned to DEC 101 on bus 116 indicates that the cached operand was not equal to the actual operand stored in the memory but that the cached operand was NOT used by EU 103, then DEC 101 does not abort the associated instruction because EU 103 will execute (non-speculatively) with the actual operand which has overwritten the cached operand in MDF 121, as described above.

DEC 101 increments by one the value in the COUNT field of the appropriate entry of OC 104 if 1) the status returned by AP 102 on bus 115 indicates that the cached and calculated operand addresses are equal AND 2) the status returned by EU 102 on bus 116 indicates that the cached and retrieved (from the memory) operands are equal. Otherwise (i.e. either the cached and calculated operand addresses are unequal OR the cached and retrieved operands are unequal), DEC 101 decrements by one the COUNT field of the appropriate entry of OC 104. (In some embodiments, the COUNT field could be reinitialized to a small value, e.g. 0, when the cached and calculated operand addresses are unequal regardless of the result of the comparison between the cached and actual operands. In some embodiments, COUNT could be incremented by one whenever the cached and retrieved operands are equal, even when the cached and calculated operand addresses are unequal.

In the alternative embodiment described above where the COUNT field is replaced by a history bit pattern (HBP) field, the bit (of the HBP field of the appropriate entry of OC 104) associated with the oldest comparison is shifted out of the HBP field, and 1 (0) is shifted into the HBP field if the cached and retrieved operands are equal (unequal). Control logic 303 contains a shift register (not shown) for modifying the HBP field in the above manner.

The appropriate entry of OC 104, whose COUNT field (or HBP field) is to be modified (as described immediately above) is the entry of OC 104 whose IA field matches the prefetch address associated with the termination status returned by EU 102 on bus 116. This prefetch address is retrieved by control logic 303 from the entry of address table 304 that is indexed by the least four significant bits of the tag indicated in the termination status.

Modification of the value in the COUNT (or HBP) field occurs even when a cached operand passed to EU 103 is not used by EU 103 for speculative execution (either because DEC 101 asserted the THIT signal because of an insufficiently large value in the COUNT field (or, in the HBP embodiment, because of the particular bit pattern in the HBP field) or because the actual operand was provided to EU 103 by MCS 105 before EU 103 used the cached operand). The value in the COUNT field is updated by either adding or subtracting (depending on the results of the above comparisons) one with a saturating adder 305 located in control logic 303, i.e. the COUNT cannot be incremented (decremented) beyond a certain maximum (minimum) value. The predetermined threshold of the last of the conditions (discussed above, whose satisfaction is required before an operand from OC 104 will be used for speculative execution) lies between the maximum and minimum values for COUNT. In one embodiment where the COUNT field is 3 bits, the maximum and minimum values for COUNT could be 7 and 0, respectively.

A new entry in OC 104 is created whenever OC 104 does not have an entry whose IA field matches the address of a read instruction requiring an operand. If possible, an entry whose VIA bit is cleared is selected for the new entry. If no such entry exists, then an entry with the smallest value in its COUNT field could be chosen. (Other replacement algorithms will be obvious to one of ordinary skill in the art.) In the selected entry, the VOA and VOD bits are cleared, the VIA bit is set, and the address of the read instruction is written into the IA field. Later when AP 102 generates the operand address, the operand address (placed on address bus 108 by AP 102) is written into the OA field of the new entry, and the new entry's VOA bit is set. When MCS 105 returns (on memory and I/O read data bus 113) the actual operand stored in the memory, the actual operand is written into the new entry's OD field, the new entry's VOD bit is set, and the new entry's COUNT field is set to an initial value (such as zero).

The particular bytes of the 4-byte OD field into which the actual operand is written are determined by the 2 LSBs of the operand address and the size of the operand. For example, if the 2 LSBs of the address of a 2-byte operand are 10, then the actual operand will be written into the third and fourth bytes of the OD field. As discussed above, in the discussed embodiment OC 104 does not store operands that straddle a 4-byte boundary. In other embodiments, the size of the OD field could be different. For example, if the OD field holds 8 bytes, then the particular bytes of the OD field into which the actual operand is written are determined by the 3 LSBs of the operand address and the size of the operand.

The specific embodiment described above is useful for caching operands for instructions that are decoded into one or more operations, exactly one of which requires unlocked access to a cacheable memory operand. This embodiment could be modified (in ways that are obvious to one of ordinary skill in the art) to provide an operand cache each of whose entries can store more than one operand. Such a cache could be used for speculative execution of multiple read access instructions, i.e. instructions that are decoded into two or more operations each of which requires an operand stored in the memory. For example, in one embodiment, OC 104 could contain 1 IA field, one VIA field, 2 OA fields (OA1, and OA2), 2 OD fields (OD1 and OD2), 2 VOA fields (VOA1 and VOA2), 2 VOD fields, and 2 COUNT (COUNT1 and COUNT2) fields. The parts of OC 104 for storing the OA1 and OA2 fields, respectively, would each be fully associative, so that an address at which the memory will be written with a particular value could be compared against the OA1 and OA2 fields of each entry in order to update the OD1 and OD2 fields associated with the matching OA1 and OA2 fields, respectively, with the particular value.

System Embodiments

Figure 6:
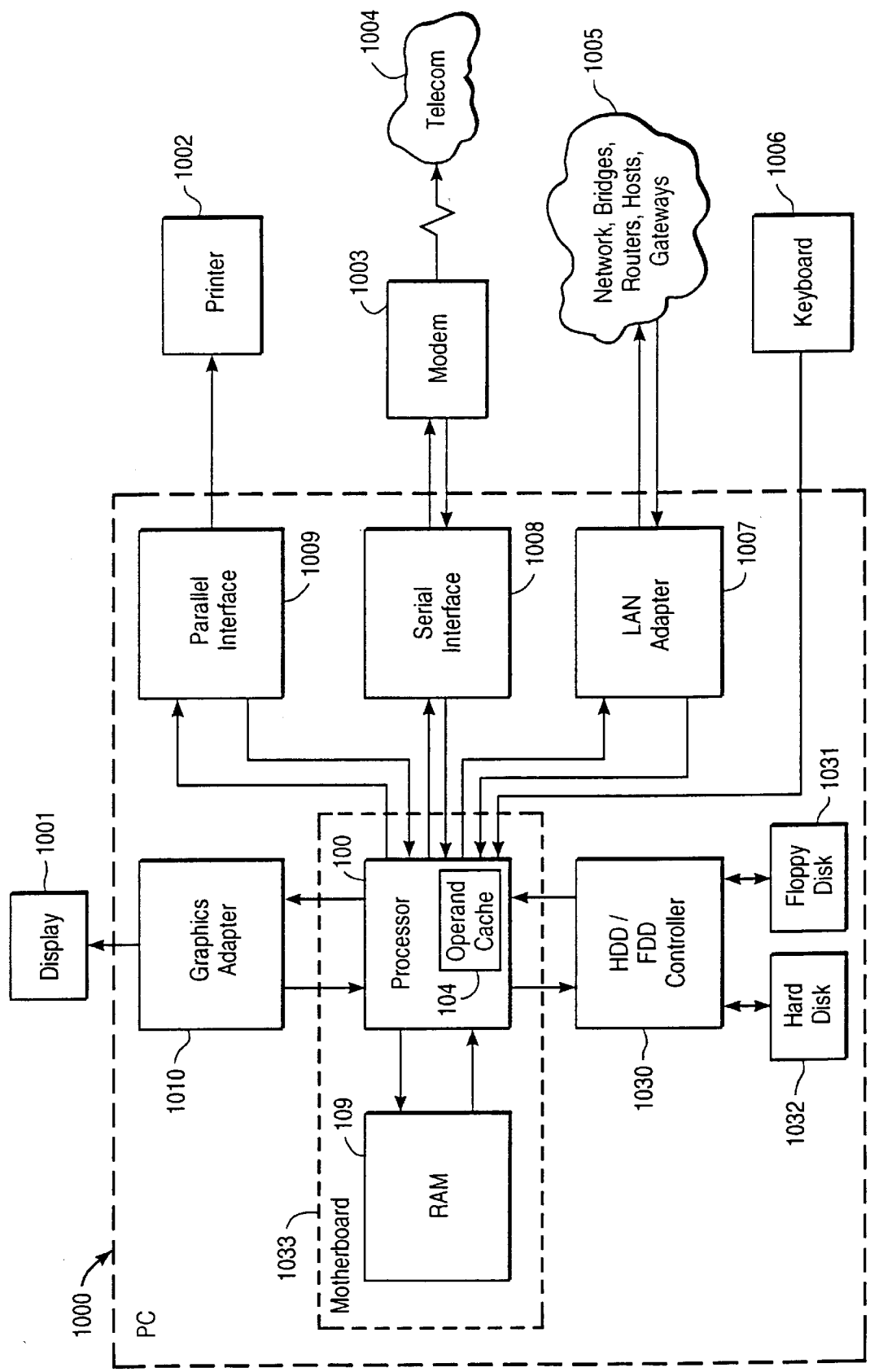
FIG. 6 is a block diagram of a personal computer incorporating a processor that contains an operand cache in accordance with an embodiment of the present invention.
Figure 7:
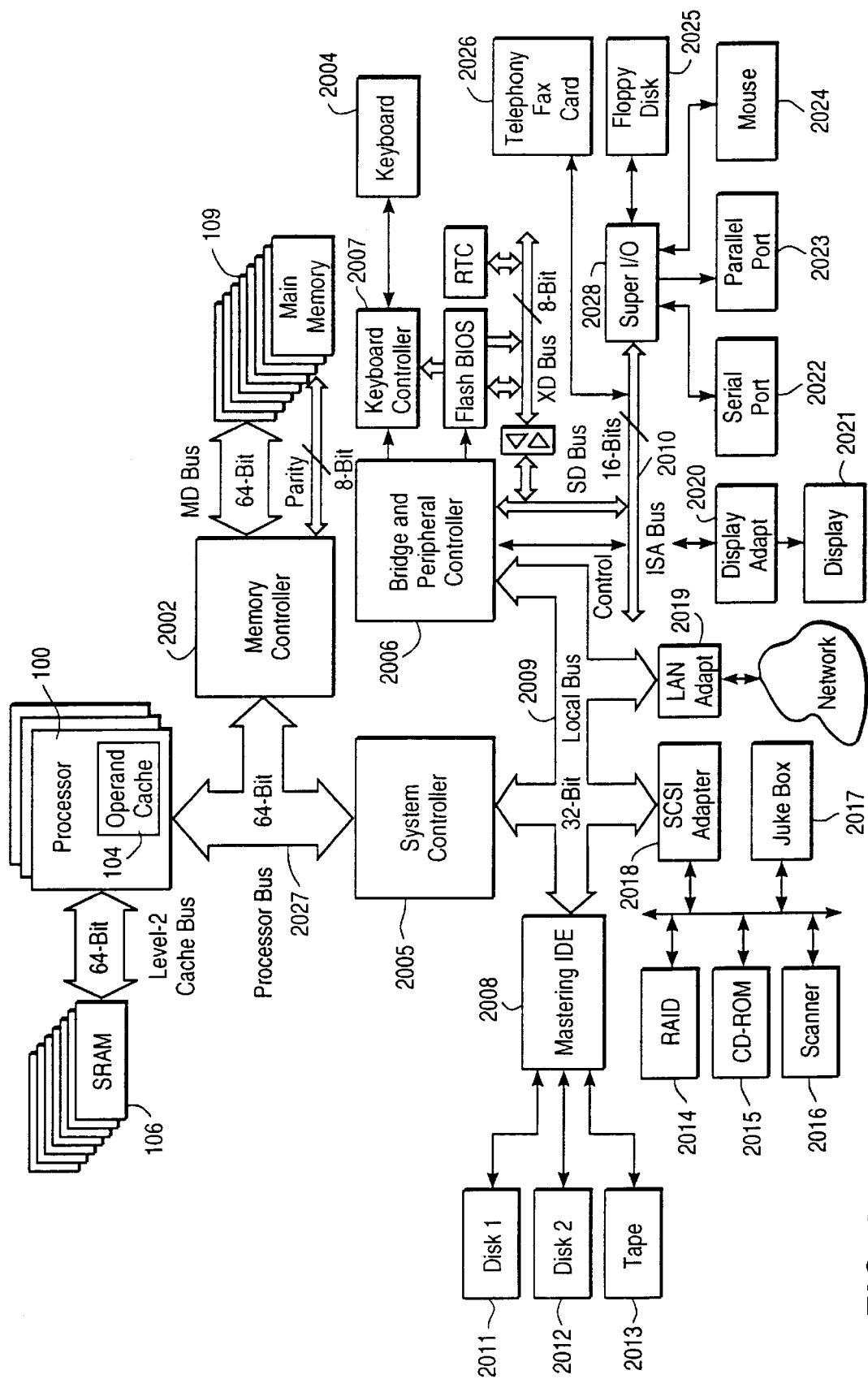
FIG. 7 is a block diagram of a networked server computer incorporating a processor that contains an operand cache in accordance with an embodiment of the present invention.
Figure 8:
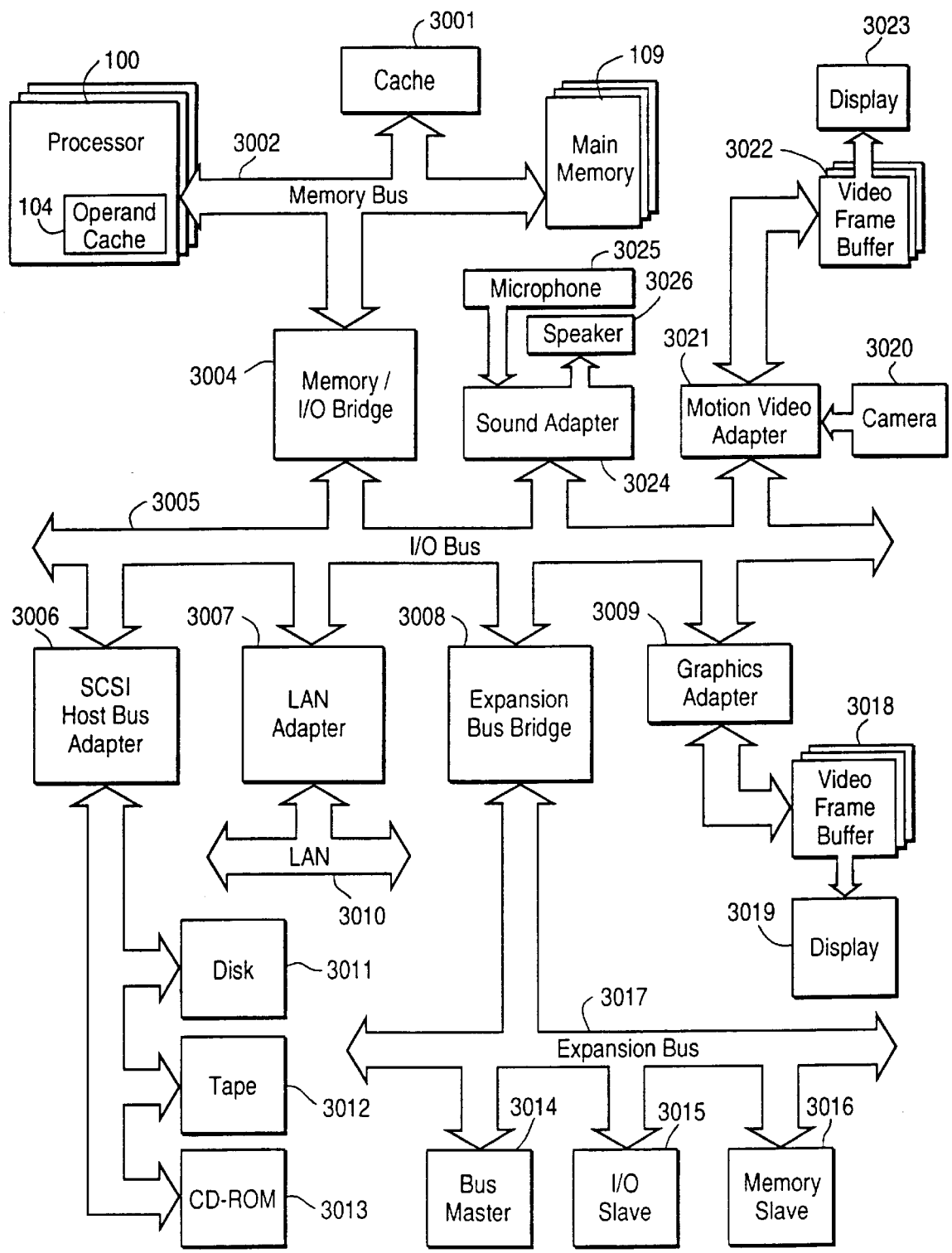
FIG. 8 is a block diagram of a multimedia computer incorporating a processor that contains an operand cache in accordance with an embodiment of the present invention.

A processor containing an operand cache in accordance with this invention may be incorporated into a wide variety of system configurations, illustratively into standalone and networked personal computer systems, workstation systems, multimedia systems, network server systems, multiprocessor systems, embedded systems, integrated telephony systems, video conferencing systems, etc. FIGS. 6–8 depict an illustrative set of suitable system configurations for processor 100 that contains operand cache 104 (FIG. 1).

In particular, FIGS. 6–8 depict suitable combinations of a processor containing an operand cache in accordance with this invention with suitable, bus configurations, memory hierarchies, and cache configurations, I/O interfaces, controllers, devices, and peripheral components.

The set of system configurations depicted in FIGS. 6–8 is merely illustrative and alternative combinations of bus configurations, memory hierarchies, I/O interfaces, controllers, devices, and peripheral components are also suitable. For example, suitable configurations for a system incorporating processor 100 include combinations of components, cards, interfaces, and devices such as:

1. video display devices, monitors, flat-panel displays, and touch screens;
2. pointing devices and keyboards 1006;
3. coprocessors, floating point processors, graphics processors, I/O controllers, and UARTs;
4. secondary and tertiary storage devices, controllers, and interfaces, caches, RAM, ROM, flash memory, static RAM, dynamic RAM
5. CD-ROMs, fixed disks, removable media storage devices, floppy disks, WORMs, IDE controllers, enhanced-IDE controllers, SCSI devices, scanners and jukeboxes;
6. PCMCIA interfaces and devices, ISA busses and devices, EISA busses and devices, PCI local busses and devices, VESA local busses and devices, Micro Channel Architecture busses and devices;
7. network interfaces, adapters and cards such as for ethernet, token ring, 10Base-T, twisted pairs, untwisted pairs, ATM networks, frame-relay, ISDN, etc.;
8. video cards and devices, 2-D and 3-D graphics cards, frame buffers, MPEG/JPEG compression/decompression logic and devices, videoconferencing cards and devices, and video cameras and frame capture devices;
9. computer integrated telephony cards and devices, modem cards and devices, fax cards and devices;
10. sound cards and devices, audio and video input devices, microphones, and speakers;
11. data acquisition and control cards and interfaces, compression/decompression logic and devices, encryption/decryption logic and devices; and
12. tape backup units, redundant/fault tolerant components and devices such as RAID and ECC memory.

Suitable combinations of such components, cards, interfaces, and devices (including those enumerated above as well as comparable components, cards, interfaces, and devices) are too numerous to list. However, those skilled in the art will appreciate the full set of suitable combinations and will recognize suitable couplings between such components, cards, interfaces, and devices. FIGS. 6–8 are illustrative of an exemplary subset of the full set of suitable combinations.

FIG. 6 shows a networked personal computer incorporating processor 100. Alternative embodiments include a cache or caches interposed between memory 109 and processor 100. Control logic and storage for such a cache may be located on or off processor 100. For example, level 1 caches (i.e., instruction cache and data cache) and cache control logic may be included in processor 100 and a level 2 cache may be present outside processor 100 (e.g. level-two cache 106 of FIG. 1). Alternative distributions are also suitable, although the level 1 caches are preferably on-chip with processor 100.

In the embodiment of FIG. 6, processor 100 and memory 109 are included as parts of motherboard 1033. A series of adapters, interfaces and controllers couple the processor to devices and peripheral components. These adapters, interfaces and controllers are typically be coupled to the processor as cards in a backplane bus of motherboard 1033. However, alternative embodiments may incorporate individual adapters, interfaces and controllers into motherboard 1033. For example, a graphics adapter 1010 may be included on motherboard 1033 with processor 100. In either case, graphics adapter 1010 is coupled to processor 100 via busses such as those described below with reference to FIGS. 7 and 8. Graphics adapter 1010 drives signals to control a display 1001 in accordance with screen updates supplied by processor 100. A parallel interface 1009 and a serial interface 1008 provide parallel port and serial port signaling interfaces for respectively interfacing to parallel port devices (e.g., printers such as a parallel printer 1002, tape backup units, etc.) and to serial devices (e.g., a modem 1003, pointing devices, and printers). Modem 1003 may be coupled to a telecom 1004. In the embodiment of FIG. 6, parallel interface 1009 and serial interface 1008 are shown as separate interfaces although each is often incorporated with a hard disk/floppy disk controller (such as 1030) as a multifunction card. Hard disk/floppy disk controller 1030 controls access to the media of a hard disk 1032 and to a floppy disk 1031. Typically, hard disk/floppy disk controllers such as hard disk/floppy disk controller 1030 provide some level of buffering of reads and writes. Hard disk/floppy disk controller 1030 may also provide limited caching for data transfers to and from the disk media.

Suitable designs for graphics adapter 1010, parallel interface 1009, serial interface 1008, and hard disk/floppy disk controller 1030 are well known in the art. For example, implementations of graphics adapter cards conforming to the VGA standard are commonly available and suitable designs are well known to those skilled in the art. Designs for parallel and serial interfaces, such as those conforming to the Centronics parallel interface and to the RS-232C serial interface specifications, respectively, are also well known to those skilled in the art. Similarly, designs for IDE and SCSI disk controllers are well known in the art and suitable implementations are commonly available. In each case, graphics adapter 1010, parallel interface 1009, serial interface 1008, and hard disk/floppy disk controller 1030 are of any such suitable design.

Finally, a LAN adapter 1007 provides a network interface to various network devices 1005, such as networks, bridges, routers, hosts, and gateways. For example, network device 1005 may include. local area networks such as 802.3 ethernet, 10base-T, twisted pair, and token ring networks. As with the other adapters and interfaces, LAN adapter 1007 is typically coupled to the processor as a card in the backplane bus of motherboard 1033. However, alternative embodiments may incorporate LAN adapter 1007 into motherboard 1033. Suitable cards and devices providing network interfaces are well known in the art and LAN adapter 1007 is any such suitable card or device.

In the network server configuration of FIG. 7, multiple instances of processor 100 storing operand cache 104 are shown coupled to a level 2 cache 106 and to a processor bus 2027. In the embodiment of FIG. 7, processor 100 includes control logic (part of MCS 105 of FIG. 1) for cache 106. The cache control logic (not shown) is coupled to 106 via a 64-bit cache bus. Alternative embodiments of processor 100 may offload the functionality of control logic for cache 106. In such an alternative embodiment, the cache control logic may be interposed between processor 100 and level 2 cache 106. In the context of bus structures presented in FIG. 7, the cache control logic could be coupled to processor 100 via processor bus 2027. Suitable modifications to the cache configuration of FIG. 7 (such as providing a cache in processor 100) will be apparent to those skilled in the art.

Referring again to FIG. 7, processor 100 is coupled to a memory controller 2002 and to a system controller 2005 via a 64-bit processor bus 2027. Memory controller 2002 provides a 64-bit interface to memory 109 including an 8-bit parity interface to support Error Correcting Codes (ECC). ECC memory is desirable, but optional, and alternative embodiments may forgo the parity interface. System controller 2005 provides the interface (or bridge) between the 64-bit processor bus 2027 and the 32-bit local bus 2009. Local bus 2009 is any high-speed I/O bus, for example, a VESA Local bus (VL bus) or Peripheral Component Interconnect (PCI) bus. A system controller 2005 provides buffering to support the potentially disparate clock rates of processor bus 2027 and local bus 2009. System controller 2005 arbitrates for use of the two busses (2027 and 2009) and may, in certain configurations, support burst data transactions across the two busses. Suitable designs for interbus bridges, such as system controller 2005 (bridging processor bus 2027 and local bus 2009) and a bridge and peripheral controller 2006 (bridging local bus 2009 and ISA bus 2010, as described below) are well known in the art. For example, U.S. Pat. No. 5,414,820, "Crossing Transfers for Maximizing the Effective Bandwith of a Dual-Bus Architecture," to McFarland et al., the entirety of which is incorporated herein by reference, describes a design suitable for bridging a high-speed system bus and a slower I/O bus. System controller 2005 and bridge and peripheral controller 2006 are of any such suitable design.

Local bus 2009 couples to multiple local bus devices and components (illustratively, to an IDE controller 2008, a SCSI Adapter 2018, a LAN Adapter 2019, and bridge and peripheral controller 2006). Certain of the local bus devices and components on local bus 2009 may optionally be provided as cards coupled to the local bus 2009 by a modular connector. In the embodiment of FIG. 7, IDE controller 2008, SCSI adapter 2018, and LAN adapter 2019 are provided as cards coupled to the local bus 2009 by a modular connector. Bridge and peripheral controller 2006 is directly connected to the local bus 2009. Alternative configurations (including configurations in which one or more of the IDE controller 2008, SCSI adapter 2018, and LAN adapter 2019 are directly connected to local bus 2009) are also suitable and will be appreciated by those skilled in the art. In addition, alternative embodiments may couple a display adapter to local bus 2009 thereby taking advantage of the generally higher bandwidth and throughput of local bus 2009 for screen updates (when compared to alternatives such as ISA, EISA, and Micro Channel Architecture busses). Because display device requirements are typically less demanding in network server configurations than in personal computer or workstation configurations, display 2021 is shown coupled through display adapter 2020 to the lower bandwidth ISA bus 2010.

IDE controller 2008 is representative of a variety of controller designs (including IDE, enhanced IDE, ATA, and Enhanced Small Device Interface (ESDI) controller designs) for interfacing storage devices such as disks, tape drives, and CD-ROMs. IDE controller 2008 is coupled to two disks (hard disk 2011 and floppy disk 2012) and to a tape backup unit 2013. Alternative configurations may interface an IDE/ enhanced IDE CD-ROM via IDE controller 2008, although a both a CD-ROM 2015 and a CD jukebox 2017 are interfaced via SCSI adapter 2018 in the embodiment of FIG. 7. Suitable designs for hard disks, floppy disks, CD-ROMs, and tape drives are all well known in the art and modular components based on those designs are commonly available for IDE, enhanced IDE, and ATA based controller designs. IDE controller 2008 is of any such suitable design, including enhanced IDE, ATA, and ESDI alternatives.

SCSI adapter 2018 is coupled to local bus 2009 and to multiple SCSI devices (illustratively, to a Redundant Array of Inexpensive Disks (RAID) 2014, CD-ROM 2015, scanner 2016, and CD jukebox 2017) in a daisy chain configuration. For illustrative purposes, the daisy chain of SCSI devices is shown as a bus in FIG. 7. Additional SCSI devices may also be coupled to SCSI adapter 2018 and additional SCSI adapters may be coupled to local bus 2009 to provide even larger numbers of SCSI device connections. Additionally, SCSI adapter 2018 and/or additional SCSI adapters may be coupled to an Industry Standard Architecture (ISA) bus such as ISA bus 2010, although coupling to a local bus such as local bus 2009 is generally preferable because of the higher bandwidth and throughput of local busses conforming to standards such as the VL bus or PCI standards.

In addition to the set of SCSI devices shown in FIG. 7, additional hard disks, printers, LAN adapters, and other computer systems may be coupled to processor 100 via a SCSI adapter such as SCSI adapter 2018. Additionally, SCSI adapter 2018 is representative of suitable alternative device adapters such as SCSI-2 and ESDI adapters. Suitable designs for RAIDs, scanners, CD-ROM jukeboxes, hard disks, CD-ROMs, printers, LAN adapters and tape drives are all well known in the art and modular components based on those designs are commonly available for SCSI adapter designs. SCSI adapter 2018 is of any such suitable design, including SCSI-2 and ESDI alternatives.

LAN adapter 2019 is coupled to local bus 2009 and, in the embodiment of FIG. 7, provides support for an IEEE 802.3 Carrier Sense Multiple Access with Collision Detection (CSMA/CD) local area network, although adapters for alternative network configurations and for media variations of an 802.3 network are also be suitable. LAN adapter 2019 is therefore representative of suitable alternative device adapters such as those based on IEEE 802.x standards (e.g., 802.3 baseband ethernet on coaxial media, twisted and untwisted pair media, and 10base-T, 802.3 broadband networks, 802.4 token passing networks, 802.5 token ring networks, etc.), and those based on Fiber Distributed Data Interface (FDDI) standards. Designs for such suitable network adapters are well known in the art and modular components based on those designs are commonly available for both VL bus and PCI bus connections. In addition, suitable designs for network adapters with ISA, SCSI, and SCSI-2 interfaces are also are well known in the art and modular components based on those designs are also commonly available. Alternative embodiments may therefore incorporate LAN adapters such as LAN adapter 2019 coupled to processor 100 via ISA bus 2010 or SCSI adapter 2018, although coupling to a local bus such as local bus 2009 is generally preferable to the ISA bus alternative because of the higher bandwidth and throughput of local busses conforming to standards such as the VL bus or PCI standards. LAN adapter 2019 is of any suitable design, for any suitable network topology and medium, and is coupled to any of the suitable bus structures (e.g., VL bus, PCI bus, ISA bus, SCSI, etc.).

ISA bus 2010 is coupled to local bus 2009 via bridge and peripheral controller 2006. Suitable bridges, like system controller 2005, are well known in the art, and bridge and peripheral controller 2006 is of any suitable design. ISA bus 2010 provides a lower-speed (when compared to local bus 2009), 16-bit I/O bus and provides modular connections for a variety of peripheral components including display adapter 2020, telephony card 2026, and a multifunction I/O card such as super I/O 2028. Display adapters such as display adapter 2020 are well known in the art and provide varying degrees of support for advanced graphics functions. For example, simple text display adapters provide text and character based graphics only. More sophisticated display adapters, such as those implementing SVGA, XGA, VESA, CGA, and Hercules graphics standards provide multibit color and higher display resolutions. Specialized display adapters may provide more advanced features, such as hardware support for 24-bit color, 3-D graphics, hidden surface removal, lighting models, Gouraud shading, depth queuing, and texture mapping. As described above, display device requirements have typically been less demanding in network server configurations than in personal computer or workstation configurations. As a result, display adapter 2020 is shown coupled to the relatively low bandwidth ISA bus 2010. However, alternative embodiments may couple an advanced or specialized display adapter to local bus 2009 thereby taking advantage of the generally higher bandwidth and throughput of local bus 2009 for screen updates (when compared to alternatives such as ISA, EISA, and Micro Channel Architecture busses).

Super I/O 2028 provides support for a serial port 2022, a parallel port 2023, a pointing device 2024, and a disk 2025. Suitable designs for combination ISA cards such as super I/O 2028 are well known in the art and such cards are commonly available. Super I/O 2028 is of any such suitable design. Modems may be coupled via serial port 2022 and printers may be coupled via either the serial port 2022 or parallel port 2023 provided by super I/O 2028. Alternatively, a single function ISA card may be used for such purposes. Modem and fax/modem cards are one example of such a single function card. Telephony card 2026 is representative of cards providing voice, fax, and speech recognition, modem, fax-on-demand services, etc. Suitable telephony cards typically conform to standards defining a modular architecture for integrating computer-based application with telephony hardware. These standards include the Communicating Applications Specification (CAS) and the more comprehensive Signal Computing System Architecture (SCSA) standard. Telephony card 2026 is of any such suitable design.

Preferably, a high performance server configuration, such as that shown in FIG. 7, includes a hierarchy of busses with varying performance characteristics each matched to the devices and components coupled thereto. Those skilled in the art will recognize a variety of suitable variations on the bus hierarchy of FIG. 7, including the elimination individual busses, the addition of multiple instances of individual busses, and redistribution of devices and components among the various busses. The server configuration of FIG. 7 is representative of all such suitable variations.

A multimedia workstation configuration for processor 100 shown in FIG. 8. As with the server configuration of FIG. 7, the multimedia workstation configuration includes a hierarchy of busses with varying performance characteristics each matched to the devices and components coupled thereto. Those skilled in the art will recognize a variety of suitable variations on the bus hierarchy of FIG. 8. A memory bus 3002 couples processor 100, a cache 3001, memory 109, and a bridge 3004. The instructions and their operands are stored in cache 3001 and memory 109. As with the network server configuration of FIG. 7, a variety of cache configurations are suitable for a multimedia workstation. Cache 3001 including control logic is coupled to processor 100 via memory bus 3002. Alternative embodiments of processor 100 (such as that shown in FIG. 1), may incorporate functionality of the control logic for cache 3001, thereby enabling a direct connection to the storage of cache 3001. Suitable modifications to the cache configuration of FIG. 8 (such as providing a cache in processor 100) will be apparent to those skilled in the art.

An I/O bus 3005 is comparable to local bus 2009 of FIG. 7 and is preferably a high speed I/O bus such as a VL bus or PCI bus. A SCSI adapter 3006, a LAN adapter expansion bus bridge 3008, a graphics adapter 3009, a sound adapter 3024, and a motion video adapter 3021 are coupled to each other and to processor 100 via I/O bus 3005. SCSI adapter 3006, LAN adapter 3007, and expansion bus bridge 3008, together with the components and devices coupled to each are comparable to corresponding adapters, components, and devices discussed above with reference to FIG. 6. For example, LAN Adapter 3007 is coupled to a LAN 3010, and graphics adapter 3019 is coupled to a display 3019 through a video frame buffer 3018.

In particular, SCSI adapter 3006 is coupled to multiple SCSI devices (illustratively, a disk 3011, a tape backup unit 3012, and a CD-ROM 3013) in a daisy chain configuration. For illustrative purposes, the daisy chain of SCSI devices is shown as a bus. Additional SCSI devices may also be coupled to SCSI adapter 3006. Suitable designs for SCSI adapter 3006 are discussed above with reference to the comparable SCSI adapter 2018 of FIG. 6. Variations on the set of SCSI devices, and on SCSI configurations in general (each of which has been described above with reference to FIG. 6) are also applicable in the multimedia workstation configuration of FIG. C. Similarly, suitable designs and variations on LAN adapter 3007 are also described above in the context of the comparable LAN adapter 2019 (see FIG. 6). Furthermore, suitable designs and variations on expansion bus 3017 are described above in the context of the comparable ISA bus 2010 (see FIG. 6). As described above, suitable designs for SCSI adapter 2018 and ISA bus 2010 are well known in the art and modular components based on such suitable designs are commonly available. SCSI adapter 3006, LAN adapter 3007, and expansion bus 3017 (together with the components and devices coupled thereto) are comparable. SCSI adapter 3006, LAN adapter 3007, expansion bus bridge 3008, and expansion bus 3017 are therefore also of any such suitable designs. Expansion bus 3017 may be coupled with a bus master 3014, an I/O slave 3015, or a memory slave 3016.

Referring to FIG. 8, multimedia adapters, such as a sound adapter 3024, a motion video adapter 3021, and a graphics adapter 3009, are each coupled to processor 100 via I/O bus 3005 and memory bus 3002 to provide for high-bandwidth transfers of multimedia data between the multimedia adapters, memory 109, and secondary storage devices (e.g., disk 3011). Sound adapter 3024 provides digital-to-analog (D/A) and analog-to-digital (A/D) interfaces for respectively synthesizing and sampling audio signals. The D/A and A/D interfaces of sound adapter 3024 are respectively coupled to an audio performance device, such as a speaker 3026, and an audio signal acquisition device, such as a microphone 3025. Other suitable audio performance devices include mixing consoles, signal processing devices, synthesizers, MIDI sequencers and power amplifiers. Other suitable audio signal acquisition devices include signal processing devices and digital samplers. Suitable designs for sound cards are well known in the art and sound adapter 3024 is of any such suitable design.

Motion video adapter 3021 provides support for capture and compression of video signals, for example, from a video camera 3020. In addition, motion video adapter 3021 supplies a display device 3023 such as a television, high-definition television, or a high resolution computer monitor with display signals via a frame buffer 3022. Alternative embodiments of motion video adapter 3021 may eliminate the frame buffer 3022 and directly drive a raster display. Furthermore, alternative embodiments of motion video adapter 3021 may decouple the video input and video output functionality of motion video adapter 3021, and instead provide separate video input and video output components.

Because video information requires large amounts of storage space, it is generally compressed. Accordingly, to display compressed video information, for example from data represented on a compact disk in CD-ROM 3013, the compressed video information must be decompressed. High bandwidth burst mode data transfers are supported by I/O bus 3005, which is preferably a local bus such as PCI with support for arbitrary length burst data transfers. In the multimedia workstation configuration of FIG. 8, video compression and decompression can be performed by processor 100 and/or by motion video adapter 3021. Thus, memory bus 3002 and bridge 3004 preferably support burst data transfers across the bridge (3004) between memory bus 3002 and I/O bus 3005. Suitable designs for motion video adapters typically provide support for the Moving Pictures Expert Group (MPEG) standards for video encoding and decoding (e.g., MPEG-1 and MPEG-2) and for JPEG. In addition, motion video adapter 3021 may support video conferencing by providing implementing video compression/decompression algorithms in accordance with H.261 (the standard compression algorithm for H.320 videoconferencing). Suitable designs for implemecomng such compression/decompression algorithms are well known in the art and motion video adapter 3021 is of any such suitable design.

Graphics adapters such as graphics adapter 3009 are well known in the art and provide varying degrees of support for advanced graphics functions. For example, graphics adapters, such as those implementing SVGA, XGA, VESA, CGA, and Hercules graphics standards provide multibit color and higher display resolutions. Specialized display adapters may provide more advanced features, such as hardware support for 24-bit color, 3-D graphics, hidden surface removal, lighting models, Gouraud shading, depth queuing, and texture mapping. Suitable designs for graphics adapters are well known in the art and modular components based on these designs are commonly available. Graphics adapter 3009 is of any such suitable design. Alternative embodiments may combine the graphics display functionality of graphics adapter 3009 with the motion video display functionality of motion video adapter 3021 outputting on a single high-resolution display device.

Conclusion

While the above is a description of a specific embodiment of the invention, various alternatives, modifications, and equivalents may be used. For example, as discussed above, in alternative embodiments the part of the operand cache storing the IA fields could be a set-associative or direct-mapped structure. In addition, the OA field (used to facilitate coherence between the memory and the operand cache) could be eliminated at the cost of a higher frequency of speculative executions using incorrect operands, as discussed above. In some embodiments, each entry of the operand cache could store more than one operand for an instruction. Therefore, the above description should not be taken as limiting the scope of the invention which is defined by the appended claims.

What is claimed:

1. A method comprising the steps of:
retriving an instruction from a memory, the instruction being stored at a first address in the memory;
determining that execution of the instruction requires execution of an operation in an execution unit of a processor, the operation requiring a first operand that is stored in the memory;
retrieving a second operand from an entry of an operand cache, wherein the entry invariably corresponds to the first address; and
executing the operation in the execution unit using the second operand as a substitute for the first operand.

2. The method of claim 1, further comprising the steps of:
determining that the first operand is stored in the memory at a second address;
retrieving the first operand from the memory;
comparing the first and second operands; and
if the first and second operands are not equal, aborting execution of the operation.

3. The method of claim 1, wherein the operand cache includes first and second memories, each entry of the first memory can store an instruction address, each entry of the second memory can store an operand and corresponds to a respective entry of the first memory, each entry of the operand cache includes a respective entry of the first memory and an entry of the second memory corresponding to the respective entry of the first memory, and the first memory is fully associative.

4. The method of claim 1, wherein the operand cache includes first and second memories, each entry of the first memory can store part of an instruction address, each entry of the second memory can store an operand and corresponds to a respective entry of the first memory, each entry of the operand cache includes a respective entry of the first memory and an entry of the second memory corresponding to the respective entry of the first memory, and the first memory is set-associative.

5. The method of claim 1, wherein the operand cache includes first and second memories, each entry of the first memory can store part of an instruction address, each entry of the second memory can store an operand and corresponds to a respective entry of the first memory, each entry of the operand cache includes a respective entry of the first memory and an entry of the second memory corresponding to the respective entry of the first memory, and the first memory is direct-mapped.

6. The method of claim 2, further comprising the step of replacing the second operand in the entry of the operand cache corresponding to the first address with the first operand, if the first and second operands are not equal.

7. The method of claim 2, further comprising the steps of:
retrieving an operand address from the entry of the operand cache corresponding to the first address;
comparing the operand address and second address; and
if the operand address and second address are unequal, replacing the operand address in the entry of the operand cache corresponding to the first address with the second address.

8. A method comprising the steps of:
retrieving an instruction from a memory, the instruction being stored at a first address in the memory;
determining that execution of the instruction requires execution of an operation in an execution unit of a processor, the operation requiring a first operand that is stored in the memory;
retrieving a second operand from an entry of an operand cache, wherein the entry invariably corresponds to the first address;
executing the operation in the execution unit using the second operand as a substitute for the first operand, only if a value stored in the entry of the operand cache corresponding to the first address satisfies a condition, the value giving an indication of the likelihood of the first and second operands being equal;
determining that the first operand is stored in the memory at a second address;
retrieving the first operand from the memory;
executing the operation in the execution unit using the first operand, if the value does not satisfy the condition;
comparing the first and second operands; and
if the first and second operands are not equal and the step of executing the operation in the execution unit using the second operand as a substitute for the first operand was performed, aborting execution of the operation.

9. The method of claim 8, wherein:
the value that gives an indication of the likelihood of the first and second operands being equal is an integer count; and
the condition is that the value exceeds a predetermined threshold.

10. The method of claim 9, further comprising the steps of:
if the first and second operands are unequal, decrementing the count; and
if the first and second operands are equal, incrementing the count.

11. The method of claim 8, wherein:
the value that gives an indication of the likelihood of the first and second operands being equal is a history bit pattern.

12. A method of maintaining consistency between an operand cache and a memory, each entry of the operand cache including an operand address field capable of storing an operand address in the memory, an instruction address field capable of storing an instruction address of an instruction referencing the operand address, and an operand datum field capable of storing an operand value, the method comprising the steps of:
in response to a particular instruction, writing a particular value occupying a number of bytes to the memory at a particular address;
selecting entries in the operand cache that have an instruction address matching the address of the particular instruction; and
writing the particular value into the operand datum field of each entry of the operand cache, among the selected entries, whose operand address field matches the particular address.

13. The method of claim 12, wherein:

the operand address field of each entry of the operand cache stores a 32-bit byte address;

the operand datum field of each entry of the operand cache can store up to a 4-byte value;

the particular address is a 32-bit byte address;

the particular address matches the operand address field of a particular entry of the operand cache if and only if the particular address and the operand address stored in the operand address field of the particular entry share the same 30 most significant bits; and the specific bytes of the operand datum field of a matching entry of the operand cache into which the particular value is written are determined by the number of bytes occupied by the particular value and by the two least significant bits of the particular address.

14. A method of maintaining consistency between an operand cache and a memory, each entry of the operand cache including a plurality of operand address fields, an instruction address field capable of storing an instruction address of an instruction referencing the operand address, and a corresponding plurality of operand datum fields, each of the operand address fields being capable of storing an operand address in the memory and each of the operand datum fields being capable of storing an operand value, the method comprising the steps of:

in response to a particular instruction, writing a particular value to the memory at a particular address;

selecting entries in the operand cache that have an instruction address matching the address of the particular instruction; and writing the particular value into each operand datum field of the operand cache among the selected entries whose corresponding operand address field matches the particular address.

15. A method comprising the steps of:

(a) retrieving an instruction from a memory, the instruction being stored at a first address in the memory;

(b) determining that execution of the instruction requires execution of first and second operations in an execution unit of a processor, the first operation requiring a first operand that is stored in the memory and the second operation requiring a second operand that is stored in the memory;

(c) retrieving third and fourth operands from an entry of an operand cache, wherein the entry invariably corresponds to the first address; and (d) executing the first and second operations in the execution unit using the third and fourth operands, respectively, as substitutes for the first and second operands, respectively.

16. An apparatus for executing an instruction stored at a first address in a memory, execution of the instruction including execution in an execution unit of an operation that specifies a first operand to be read from the memory, the apparatus comprising:

an operand cache including a plurality of entries, the plurality of entries including a first entry invariably corresponding to the first address and storing a second operand;

means for using the first address to access the first entry, for retrieving the second operand and for passing the second operand to the execution unit; and means for executing the operation in the execution unit using the second operand as a substitute for the first operand.

17. The apparatus of claim 16, wherein the means for using the first address to access the first entry comprise a fully associative structure.

18. The apparatus of claim 16, wherein the means for using the first address to access the first entry comprise a set-associative structure.

19. The apparatus of claim 16, wherein the means for using the first address to access the first entry comprise a direct-mapped structure.

20. The apparatus of claim 16, further comprising:

means for determining that the first operand is stored in the memory at a second address;

means for retrieving the first operand from the memory;

means for comparing the first and second operands; and means for aborting execution of the operation, if the first and second operands are not equal.

21. The apparatus of claim 20, wherein:

the entry of the operand cache corresponding to the first address stores a value that gives an indication of the likelihood of the first and second operands being equal.

22. The apparatus of claim 21, wherein the value that gives an indication of the likelihood of the first and second operands being equal is an integer count, the apparatus further comprising:

means for executing the operation in the execution unit using the first operand instead of the second operand, if the count does not exceed a predetermined threshold.

23. The apparatus of claim 22, further comprising:

means for decrementing the count if the first and second operands are determined to be unequal; and means for incrementing the count if the first and second operands are determined to be equal.

24. The apparatus of claim 21, wherein the value that gives an indication of the likelihood of the first and second operands being equal is a history bit pattern, the apparatus further comprising:

a table including a plurality of entries, each of the entries storing a bit and being indexed by a respective bit pattern; and means for executing the operation in the execution unit using the first operand instead of the second operand, if the bit in the entry of the table indexed by the history bit pattern is not set.

25. The apparatus of claim 24, further comprising:

a shift register for shifting a logical one bit into the history bit pattern, if the first and second operands are determined to be equal and for shifting a logical zero bit into the history bit pattern, if the first and second operands are determined to be unequal.

26. The apparatus of claim 20, further comprising:

means for replacing the second operand in the entry of the operand cache corresponding to the first address with the first operand, if the first and second operands are not equal.

27. The apparatus of claim 20, wherein the entry of the operand cache corresponding to the first address stores an operand address, the apparatus further comprising:

means for retrieving the operand address;

means for comparing the operand address and second address; and means for replacing the operand address in the entry of the operand cache corresponding to the first address with the second address if the operand address and second address are unequal.

28. An apparatus for maintaining consistency between an operand cache and a memory, each entry of the operand cache including an operand address field capable of storing an operand address in the memory, an instruction address field capable of storing an instruction address of an instruction referencing the operand address, and an operand datum field capable of storing an operand value, the apparatus comprising:

the operand cache; and means for writing a particular value occupying a number of bytes into the operand datum field of each entry of the operand cache from a select group of entries that have an instruction address matching the address of a particular instruction whose operand address field matches a particular address, in response to a write of the particular value to the memory at the particular address.

29. The apparatus of claim 28, wherein:

the operand address field of each entry of the operand cache stores a 32-bit byte address;

the operand datum field of each entry of the operand cache can store up to a 4-byte value;

the particular address is a 32-bit byte address;

the particular address matches the operand address field of a particular entry of the operand cache if and only if the particular address and the operand address stored in the operand address field of the particular entry share the same 30 most significant bits; and the specific bytes of the operand datum field of a matching entry of the operand cache into which the particular value is written are determined by the number of bytes and by the two least significant bits of the particular address.

30. An apparatus for maintaining consistency between an operand cache and a memory, each entry of the operand cache including a plurality of operand address fields and a corresponding plurality of operand datum fields, each of the operand address fields being capable of storing an operand address in the memory, an instruction address field capable of storing an instruction address of an instruction referencing the operand address, and each of the operand datum fields being capable of storing an operand value, the apparatus comprising:

the operand cache; and means for writing a particular value into each operand datum field of the operand cache from a select group of entries that have an instruction address matching the address of a particular instruction whose corresponding operand address field matches a particular address, in response to a write of the particular value to the memory at the particular address.

31. An apparatus for executing an instruction stored at a first address in a memory, execution of the instruction including execution in an execution unit of a first operation that specifies a first operand to be read from the memory and execution in the execution unit of a second operation that specifies a second operand to be read from the memory, the apparatus comprising:

an operand cache including a plurality of entries, the plurality of entries including a first entry invariably corresponding to the first address and storing third and fourth operands;

means for using the first address to access the first entry, for retrieving the third and fourth operands and for passing the third and fourth operands to the execution unit; and means for executing the first and second operations in the execution unit using the third and fourth operands, respectively, as substituted for the first and second operands, respectively.

* * * * *